United States Patent
Gindlesperger

(10) Patent No.: US 8,682,743 B2
(45) Date of Patent: Mar. 25, 2014

(54) SYSTEM AND METHOD FOR COMPETITIVE PRICING AND PROCUREMENT OF CUSTOMIZED GOODS AND SERVICES

(75) Inventor: William A. Gindlesperger, Chambersberg, PA (US)

(73) Assignee: e-Lynxx Corporation, Chambersburg, PA (US)

( * ) Notice: Subject to any disclaimer, the term of this patent is extended or adjusted under 35 U.S.C. 154(b) by 72 days.

(21) Appl. No.: 13/478,034

(22) Filed: May 22, 2012

(65) Prior Publication Data

US 2012/0296762 A1 Nov. 22, 2012

Related U.S. Application Data

(63) Continuation of application No. 12/855,423, filed on Aug. 12, 2010, now Pat. No. 8,209,227, which is a continuation of application No. 12/268,285, filed on Nov. 10, 2008, now Pat. No. 7,788,143, which is a continuation of application No. 09/450,023, filed on Nov. 29, 1999, now Pat. No. 7,451,106.

(60) Provisional application No. 60/110,248, filed on Nov. 30, 1998.

(51) Int. Cl.
G06Q 30/00 (2012.01)

(52) U.S. Cl.
USPC ........................................ 705/26.1; 705/27.1

(58) Field of Classification Search
USPC ................................................. 705/26.1, 27.1
See application file for complete search history.

(56) References Cited

U.S. PATENT DOCUMENTS 5,758,328 A * 5/1998 Giovannoli .................. 705/26.4
6,014,644 A * 1/2000 Erickson ........................ 705/37

OTHER PUBLICATIONS

Reiher, Michael. American Printer, suppl. Digital & Prepress Links (Aug. 1996). Downloaded from ProQuest on the Internet on Sep. 23, 2013, 4 pages.*
O'Brien, Katherine. American Printer 220.1 (Oct. 1997): 30-32. Downloaded from ProQuest on the Internet on Sep. 23, 2013, 3 pages.*

* cited by examiner

*Primary Examiner* — James Zurita
(74) *Attorney, Agent, or Firm* — Novak Druce Connolly Bove + Quigg LLP

(57) ABSTRACT

An apparatus and method for selecting a vendor for a customized good or service, including receiving vendor attributes from the vendors and receiving invitation-for-bid data from the buyer defining a custom job. The invitation-for-bid-data is received through a web browser and is compared to the vendor's attributes based on at least one selection criterion to generate a vendor selection pool of vendors qualified to bid on the job. Vendors in the vendor selection pool receive a vendor's invitation-for-bid. A bid is received from at least one vendor. The lowest price bid is identified, the buyer is informed of the identity of the selected vendor, and solicited for approval of the selected vendor. Upon receipt of approval from the buyer, an order is issued to the selected vendor. The non-selected vendors in the selection pool are informed of the bid prices and of the selection results.

20 Claims, 13 Drawing Sheets

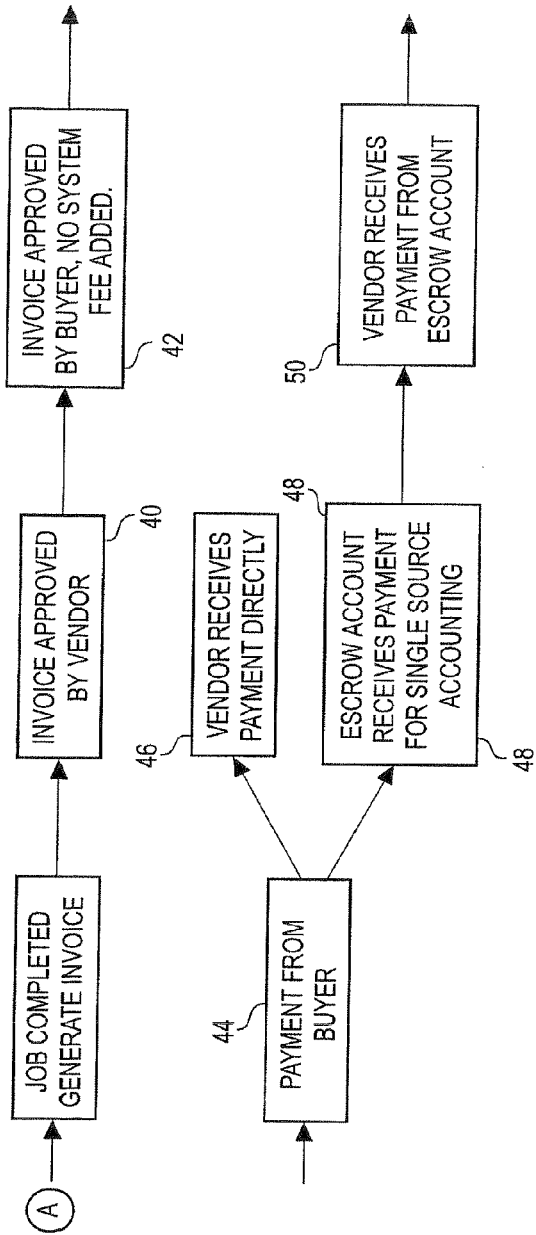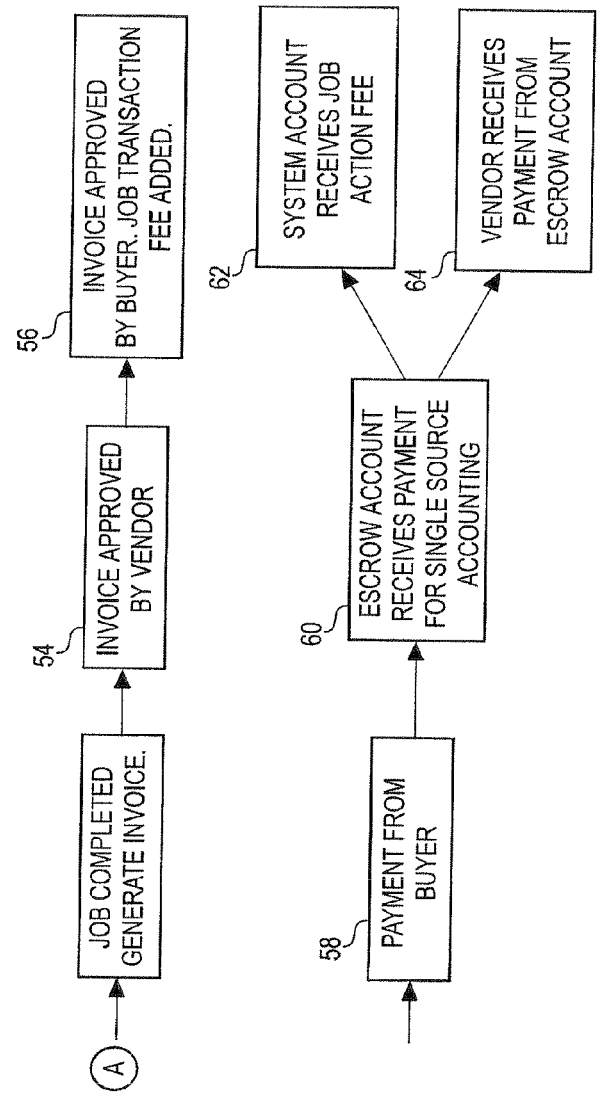
Fig. 1C
Fig. 1D

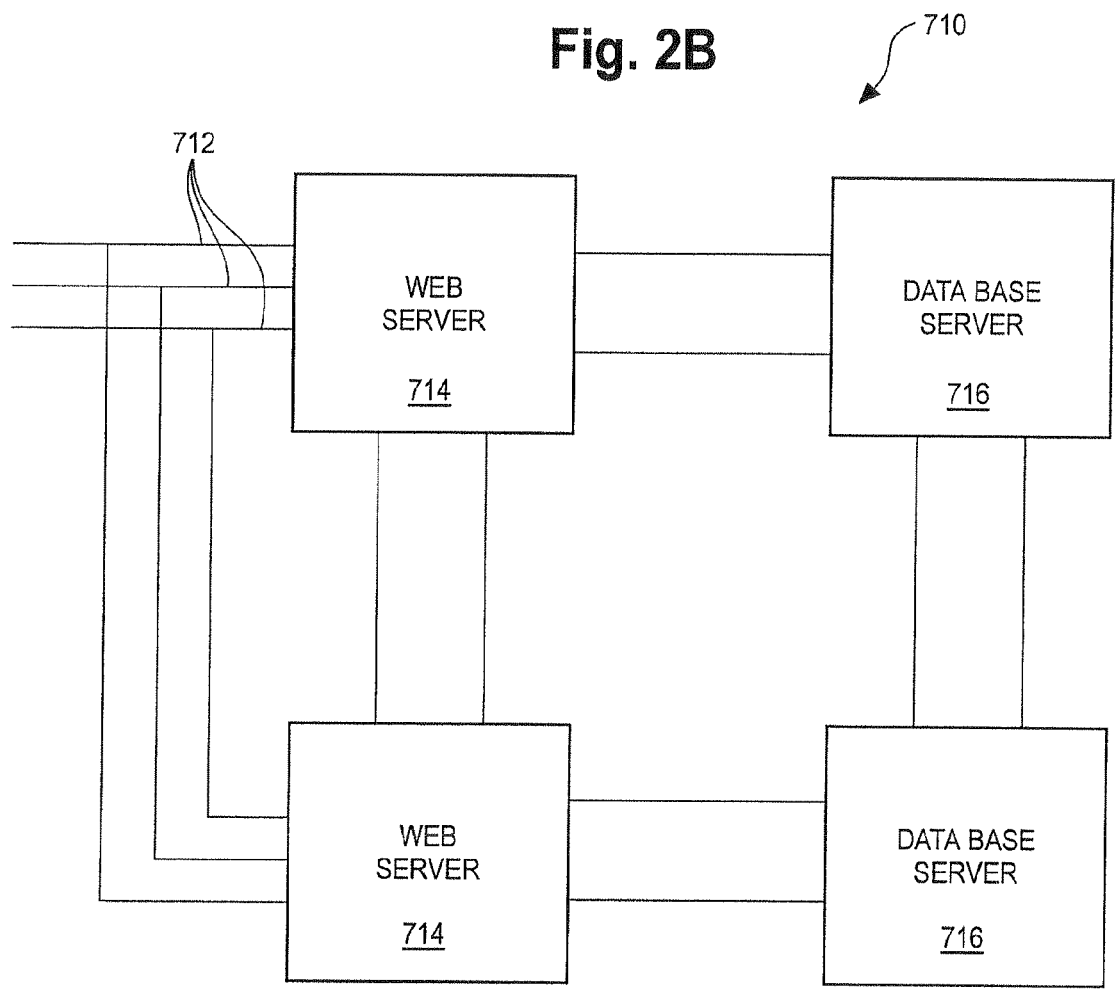

SYSTEM AND METHOD FOR COMPETITIVE PRICING AND PROCUREMENT OF CUSTOMIZED GOODS AND SERVICES

CROSS-REFERENCE TO RELATED APPLICATIONS

This is a continuation application of U.S. application Ser. No. 12/855,423, filed on Aug. 12, 2010, which is a continuation of U.S. application Ser. No. 12/268,285, filed on Nov. 10, 2008, now U.S. Pat. No. 7,788,143, which is a continuation of application Ser. No. 09/450,023, filed on Nov. 29, 1999, now U.S. Pat. No. 7,451,106, which claims the benefit of U.S. Provisional Application No. 60/110,248, filed on Nov. 30, 1998.

FIELD OF THE INVENTION

The present invention generally relates to an apparatus and method for creating a database representing pools of vendors of customized goods and services for one or more subscribing buyers, and for selecting the lowest bidder from the database's represented vendor pool on a per-job basis and, more particularly, for (i) creating and maintaining a database representing a vendor base or pool for each subscribing buyer of customized goods and services, the database further representing capabilities of said vendors, (ii) receiving solicitation data containing production specifications and related contracting terms and vendor qualification criteria from buyers, (iii) extracting vendor qualification criteria data from said solicitation data, (iv) transmitting invitations to bid on said solicitations to qualified ones of said vendors, based on said vendor qualification criteria data, and (v) selecting from among the responding vendors based on the response price and other factors.

BACKGROUND OF THE INVENTION

Customized goods and services, such as print and other types of digitally mastered information product goods (e.g. CDs and DVDs) and services, differ from non-custom manufactured goods or services in that such goods and services are generally not pre-stocked as "off-the-shelf" items but, instead, must be specifically manufactured or provided to meet the buyer's particular requirements. Consequently, customized goods and services cannot simply be purchased "off-the-shelf" at fixed prices appearing on standard price lists. Instead, their prices are established when the exact goods or services are actually specified, either by single or multiple order(s), invitation-for-bid ("IFB"), request-for-quote ("RFQ"), or request-for-proposal ("RFP"); only then can the manufacturer or service provider assess the precise quality and manufacturing or service specifications required to perform the job.

The general procedure used in the prior art of procurement of customized goods and services is that the buyer provides the actual solicitation to one or more vendors with whom, in general, the buyer has had sufficient previous experience or recommendation to know what type of product or level of service can be provided. For purposes of this description the term "vendor", unless further qualified or clearly having a different meaning readily apparent from the context, means an entity in the market for providing customized goods and services and, unless specified, does not require that the entity being qualified meets any criteria or preference. Similarly, for purposes of this description, the terms "solicitation" or "solicitations" shall mean, individually or collectively, an order, IFB, RFQ, or RFP, while the terms "quote" or "bid" shall be used interchangeably and mean any type of pricing or other response from a vendor to an order, IFB, RFQ, or RFP.

After receiving the solicitation, the vendor reviews the buyer's product manufacturing and delivery specifications and requirements that are stated therein, including but not limited to physical specifications, characteristics of style, quantities, mode of shipment, delivery schedule, and quality level required to perform individual jobs or estimated job requirements over a given period of time. Then based on its previous experience in producing or providing the requested goods or services, the vendor provides an estimated price quote or bid to the buyer. Generally, the buyer will provide the solicitation to a single or very limited number of vendors, and either (1) award the contract to the single or lowest bidder; (2) award the contract to a vendor whose quality or working relationship is preferred if that preferred vendor's quote or bid is sufficiently low; or (3) "shop" the lowest quote or bid to other vendors to determine if they are willing to match or underbid the initial low quote or bid.

In following this general procedure in the prior art, however, buyers of customized goods or services confront the so-called "iron triangle" of quality, timeliness, and cost. Buyers want a product or service that is good, fast, and cheap, but what they discover is that traditional procurements methods will, at best, only achieve two of these three goals on any given job. Thus, a buyer might demand and receive top quality on a "rush" order, but only at a high cost. Conversely, negotiating a lower price may achieve cost savings, but also compromise quality and timeliness.

This problem is heightened by great elasticity in the so-called "market" price of many customized goods or services, which can vary widely from vendor to vendor and from week to week. This elasticity results from the fact that pricing of such customized goods or services greatly depends on (1) the level of service and quality desired; (2) the labor and equipment required to produce the job or provide the service; (3) the amount time involved in producing the job or providing the service; (4) whether the job or service can be engineered, designed, or furnished in a cost-effective way; and (5) whether the customer order can be included in the vendor's production schedule, while still complying with the required delivery date.

This last factor is particularly crucial when the vendors are "hard-iron" manufacturers or service providers with high overhead and labor costs, such as suppliers of print and information products. In the case of such vendors, idle equipment and labor can be devastating to their profit margins. At the same time, such vendors must be ready to service their regular customers on short notice, which means planning for downtime in the production schedule to ensure that their machinery is available for "rush" orders. Because of the limitations of traditional procurement methods, vendors are often left not only with unscheduled holes in their production schedules, but also unable to fill downtime purposefully set aside for last minute "rush" orders from regular customers. Managing customer job orders in a way that minimizes these "holes" in the production schedule is frequently what distinguishes the profitable vendor from the insolvent one.

As a result of this tension between the cost of idle equipment and labor and the need to preserve downtime for regular customers, vendors are constantly seeking short-turnaround jobs to fill their production "holes" when their regular orders do not materialize. To obtain these short-turnaround jobs, many vendors will resort to extremely low pricing, provided that they can do so without losing the goodwill of their regular customers. This pricing strategy is called "contribution pricing" because it involves bidding for work at below normal profit margins knowing that any income above out-of-pocket costs will still "contribute" 100% to the vendor's bottom line in comparison to the cost of letting its labor and machinery remain idle. In current printing markets, for example, "contribution" pricing on a regular basis is found in federal and state government procurements of customized print goods.

Contribution pricing occurs in the public sector because federal and state agencies are often required by law to make bid opportunities available to large numbers of vendors in order to obtain "full and open competition." Where government agencies are further required to award contracts to the lowest responsive and responsible bidder, procurements of customized goods typically result in poor quality control and relatively high administrative costs that must be subsidized by the taxpayer. In contrast, traditional procurement methods and prior art devices in the private sector have emphasized quality control by limiting the vendor pool for customized goods and services to a small number of reliable vendors with whom the buyer has previously done business.

There is a significant cost problem, however, associated with limiting the vendor pool to a small number of suppliers. Lacking the discipline of a more competitive market, vendors who know that they are bidding against limited competition will offer and charge higher prices. Prior art methods attempt to address this problem of non-competitive pricing in one of two ways: (1) longer term contracts with preferred vendors in established commercial relationships that lump procurements together over an extended contract period in the hope of enhancing the buyer's purchasing power and thereby obtaining controlled term pricing; and (2) "best buy" or "best value" procurement practices that award jobs based on factors other than price and which are largely creative user or, quality control driven. Such alternative prior art methods are now being adopted increasingly in the public sector due precisely to quality issues arising from "full and open competition."

In both public and private sector customized product and service markets, however, traditional procurement methods and prior art devices have failed to solve the "iron triangle" because of their inability to take advantage of "contribution" pricing without incurring prohibitive administrative costs or sacrificing quality or timeliness. There are several key reasons for this failure.

First, in order to find the manufacturer or service provider who is willing to offer the lowest "contribution" pricing on any given job, the buyer must often request price quotations from a larger vendor pool than they are prepared or equipped to manage efficiently. A larger vendor pool would, in theory, be desirable because it usually means that a lower price quote or bid can be received. This is well-known in the general business world. In the actual business environment, however, identifying such a large vendor pool is generally not practical. The main reason is that gathering and maintaining information about a large number of current and potential vendors is time consuming and expensive. Few companies have the time, money, or inclination to maintain a large, up-to-date database on such potential vendors, particularly when soliciting dozens of quotes or bids can itself require staff and administrative time that costs more than the savings generated from receiving a greater number of competitive bids. This disparity is heightened by the fact that many customized goods or services involve relatively low dollar purchases or procurements, which is often the case, for example, with printing jobs.

Second, even if a buyer were willing to absorb the administrative costs associated with establishing, maintaining, and managing a large database of vendors to improve the competitiveness of their bidding, the buyer is often reluctant to do so because quality control becomes more difficult as the vendor pool increases. A crucial aspect of quality control is obtaining information about the performance record of vendors from whom the buyer would like to solicit quotes or bids, particularly with respect to the quality and dependability of goods and services output by each vendor in the vendor pool. This is difficult not due only to the volume and nature of the information required, but also to the fact that the buyer must generally obtain such information from its own dealings with the vendor. In such circumstances, the reliability, price history, and quality of a vendor's work for other buyers may not be obtainable. As a result, buyers are reluctant to seek goods or services from new vendors because negative information on their reliability or quality may then have to be learned firsthand.

This problem is made more acute by the fact that the procurement of customized goods and services frequently requires specialized knowledge and expertise in finding the right vendor for each job. Most businesses hire purchasing officials with general procurement knowledge who are then given responsibility for a wide range of purchases. As a result, the purchasing official is ill-equipped to manage large numbers of customized procurements efficiently and without loss of control over the production of individual jobs. Instead, the purchasing official is forced to rely on the vendor's expertise in designing or engineering a job, which often results in a more expensive (and more profitable for the vendor) design, engineering, or production process.

Third, even if the buyer is willing to make the financial investment necessary to hire procurement personnel with the administrative experience, staffing resources, and specialized product knowledge to manage a large pool of vendor and monitor each job closely for quality control and contract compliance, the buyer has no guarantee that vendors will offer contribution pricing. The reason is that even vendors who would gain, in an immediate sense, from contribution pricing to fill a production hole are frequently unwilling to offer that pricing to their regular customers. Such vendors are primarily concerned about losing their customers' goodwill when the vendor is unable or otherwise fails to offer contribution pricing on a repeat basis. After once receiving a quote or bid reflecting contribution pricing (e.g., due to idle machine time at the vendor's production plant when the contract must be performed), the regular customer would expect to pay the same low prices for all future jobs from that same vendor, even when the vendor lacks idle production capacity. The vendor is then faced with a Hobson's choice of either risking the loss of the customer account by refusing the less profitable job (thereby forfeiting the sales and marketing costs previously incurred to obtain the customer account) or suffering financial loss by displacing more profitable work to accept the regular customer's lower paying work.

As a consequence of the foregoing obstacles to overcoming the "iron triangle" of quality, timeliness, and cost, there has been a long felt need for a system and method of competitive pricing for custom goods and services that: (1) identifies and manages a vendor pool large enough to obtain the benefits of enhanced pricing competition, without imposing high administrative costs; (2) enables the buyer to procure from a greater number of vendors without causing a loss of quality control or contract compliance; and (3) encourages vendors to offer contribution-level pricing on a consistent basis, while identifying vendors willing to offer contribution pricing on any given job.

SUMMARY OF THE INVENTION

It is therefore an object of the present invention to provide a system and method meeting the above-identified long-felt needs. The present invention meets these and other objectives by providing a system and method for matching and selecting a vendor meeting both general and job-specific requirements specified by a buyer, from a plurality of vendors, comprising, in one example embodiment, an apparatus and method for quantifying a set of buyer's attributes associated with at least one kind of customized good or service and quantifying a set of vendor's attributes associated with the manufacturing, production, or provider capabilities corresponding to each of a plurality of vendors. The example embodiment further comprises means and method steps for comparing the set of quantified buyer's attributes to each quantified set of vendor's attributes corresponding to each of the plurality of vendors, the comparison being in accordance with a buyer defined selection criteria and generating, as a result of the comparison, a data set representing a vendor selection pool for the particular buyer. In addition, the example embodiment comprises means and method steps for receiving a data representing a buyer's invitation for bid to manufacture, produce, and/or provide at least one manufactured item or customized service and for submitting a corresponding data to each of the vendors represented by the data in the vendor selection pool. The described example embodiment further comprises means and method steps for receiving a bid data, having a field representing a bid price (which may be based on alternative specifications suggested by the responding vendor), from each vendor in the vendor selection pool that submits a bid data, for identifying the received bid data having the lowest bid price, and for transmitting a data to the buyer representing the identity of the identified vendor and notifying the buyer to transmit a data representing a approval or disapproval of the identified vendor. In addition, the described example embodiment includes means and method steps for receiving an approval data from the buyer and, in response to receipt, for generating and transmitting an order to the selected vendor for the purchase of at least one manufactured item or customized service at the bid price, and for transmitting or otherwise releasing a data to all vendors in the selection pool, informing each of the identity of the selected vendor and the rank order value of the bids submitted by all other selection pool vendors.

A further described embodiment of the invention implements the reception of buyer attribute data and vendor attribute data by a web site accessible through the Internet. According to this embodiment, a web site includes a graphical user interface through which potential vendors are asked to input information characterizing their products and services, their manufacturing capability, and other attribute data. Similarly, the web site has a graphical user interface accessible to buyers, for entering solicitation data and other information, including preferred vendors and standard or optional vendor selection criteria.

A further embodiment of the invention includes means and method steps for maintaining multiple vendor pools for each of a plurality of buyers, the multiple vendor pools for a particular buyer corresponding to multiple product or service types that the buyer procures.

A still further embodiment of the invention transmits and/or releases data representing the bid price of all received bids, to all vendors who submitted bids or received solicitations.

A still further embodiment of the invention automatically generates a set of project milestone data, in reverse scheduling format, for use in monitoring the winning vendor's progress on the buyer's requested manufactured item or customized service.

A still further embodiment of the invention has means and method steps for receiving an invoice data from the winning vendor upon completion of the job, and generating a corresponding invoice for the buyer's approval. In this embodiment, upon invoice approval, the system can prepare the invoice data for direct transmission to the buyer's accounting system for (i) the proper allocation of costs associated with the job within the buyer entity and (ii) the transfer of funds for payment of the buyer-approved invoice from the buyer into a single escrow account for subsequent transfer of the payment funds to the vendor. This embodiment provides a single source accounting feature for buyers dealing with a plurality of vendors regardless of the type of fee charged for using the invention.

A still further embodiment of the invention has means and method steps for allocating a service, user, access, licensing, or similar fee for using the invention to each job transaction. For purposes of this description, such fee shall be referred to as a "job transaction fee." In this embodiment, the system receives an invoice data from the winning vendor upon completion of the job, and generates for the buyer's approval a corresponding invoice that, in addition to the invoice payment data from the winning vendor, includes the job transaction fee associated with the individual job. Upon invoice approval and the transfer of funds indicated on the buyer-approved invoice into an escrow account, the system can then allocate and distribute such funds by transmitting the job transaction fee included on the buyer-approved invoice to a system administration account and transmitting the remainder of such funds to the winning vendor.

BRIEF DESCRIPTION OF THE DRAWINGS

The features and advantages of the present invention will be more fully described by the following detailed description of the preferred embodiment of the invention, which is to be considered together with the accompanying drawings wherein like numbers refer to like parts and further wherein:

FIGS. 1C and 1D show flow charts of example embodiments of the invoicing and payments procedures associated with the system operation;

FIG. 2B shows a more detailed example embodiment of an arrangement of the system's web servers and database servers shown generally on FIG. 2A at Block 621;

DETAILED DESCRIPTION OF THE PREFERRED EMBODIMENTS

The method and apparatus of the present invention will be better understood by the description below of its operation in reference to the attached figures. It is to be understood, though, that the present invention is not limited to the example embodiments and arrangements described herein, but that it also comprises any modifications or equivalents within the scope of the claims.

Figure 1A:
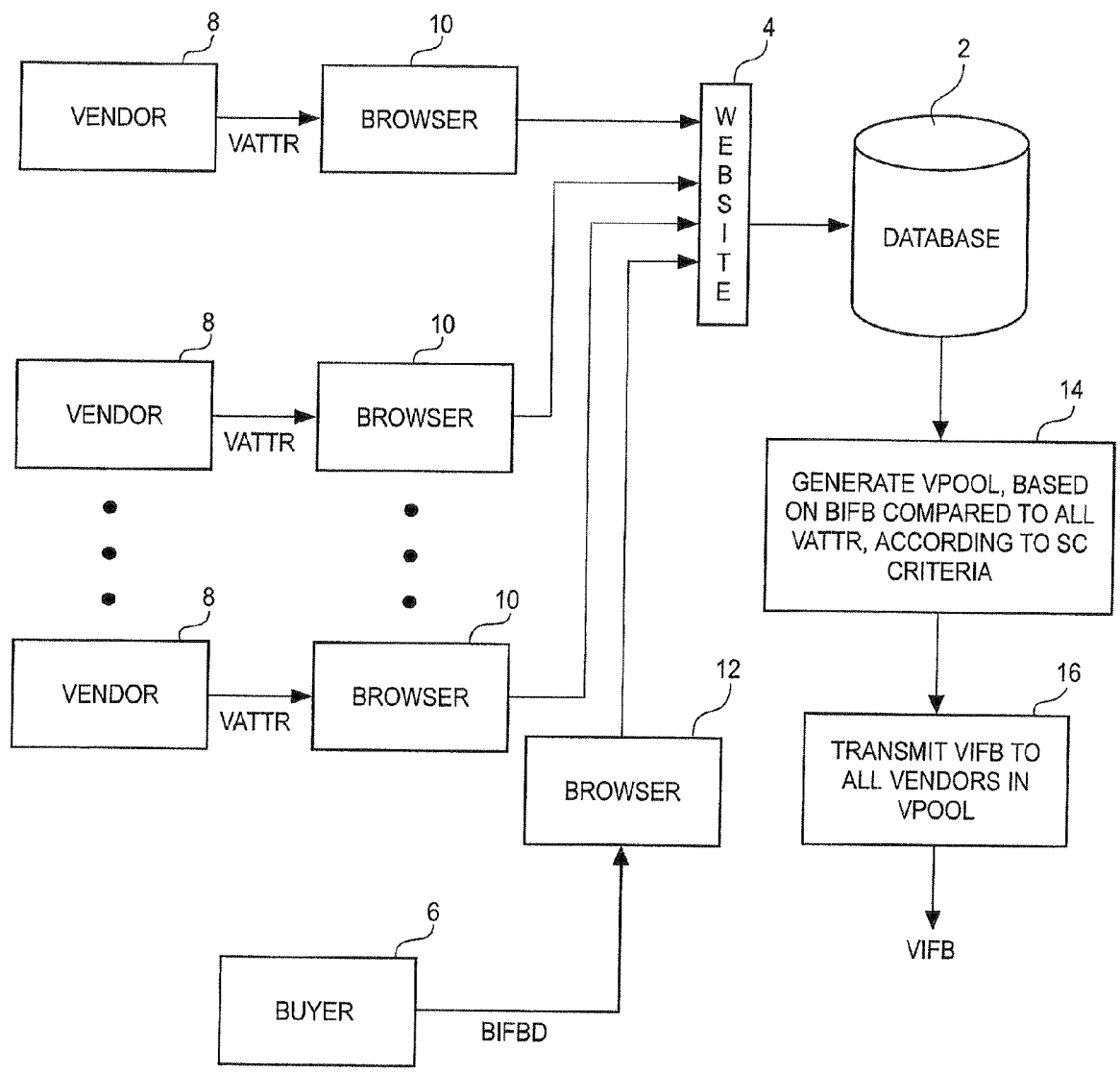
FIGS. 1A and 1B show a typical communications system and arrangement of an example embodiment of the invention, and a flow chart of the system operation.
Figure 1B:
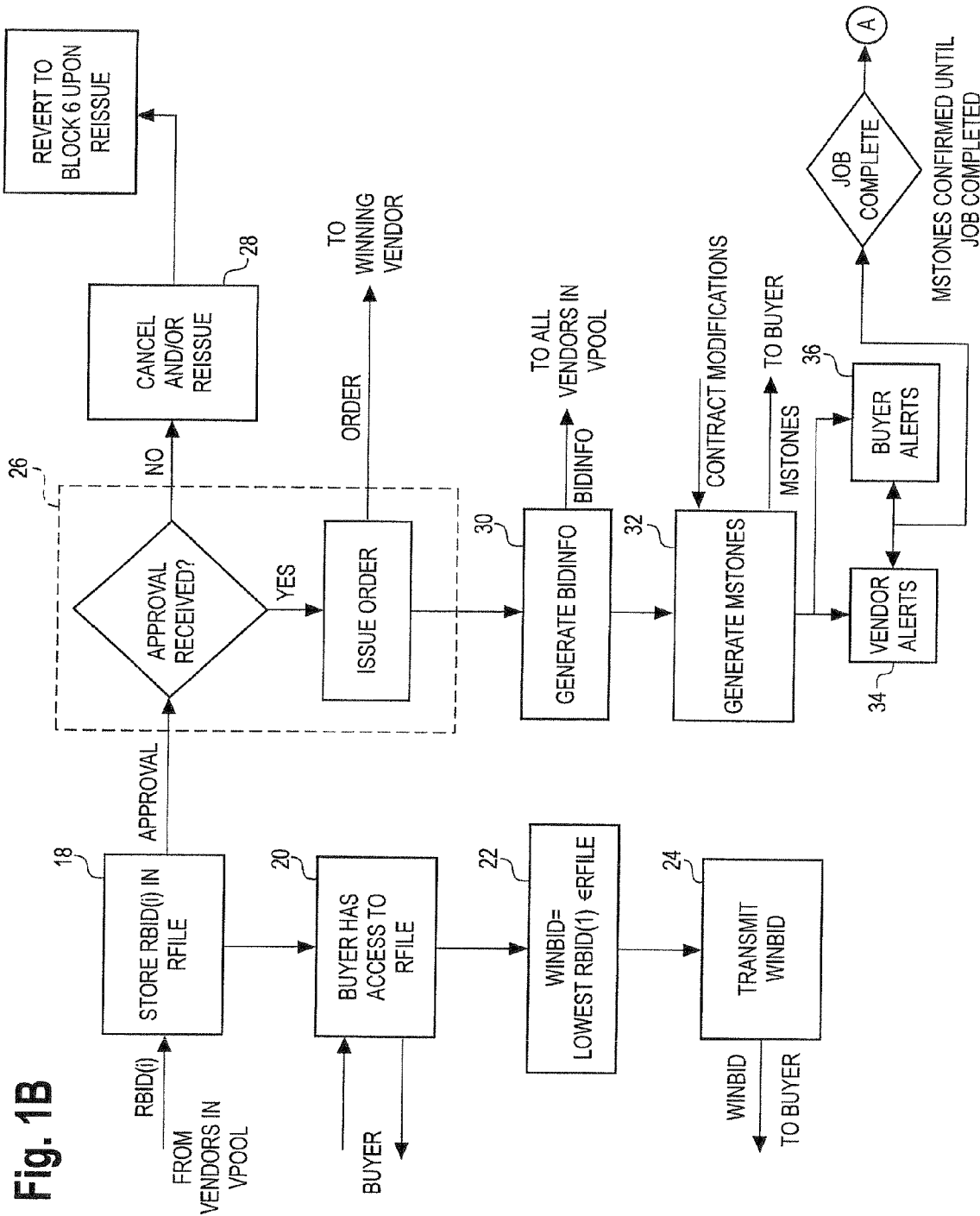
Figure 2A:
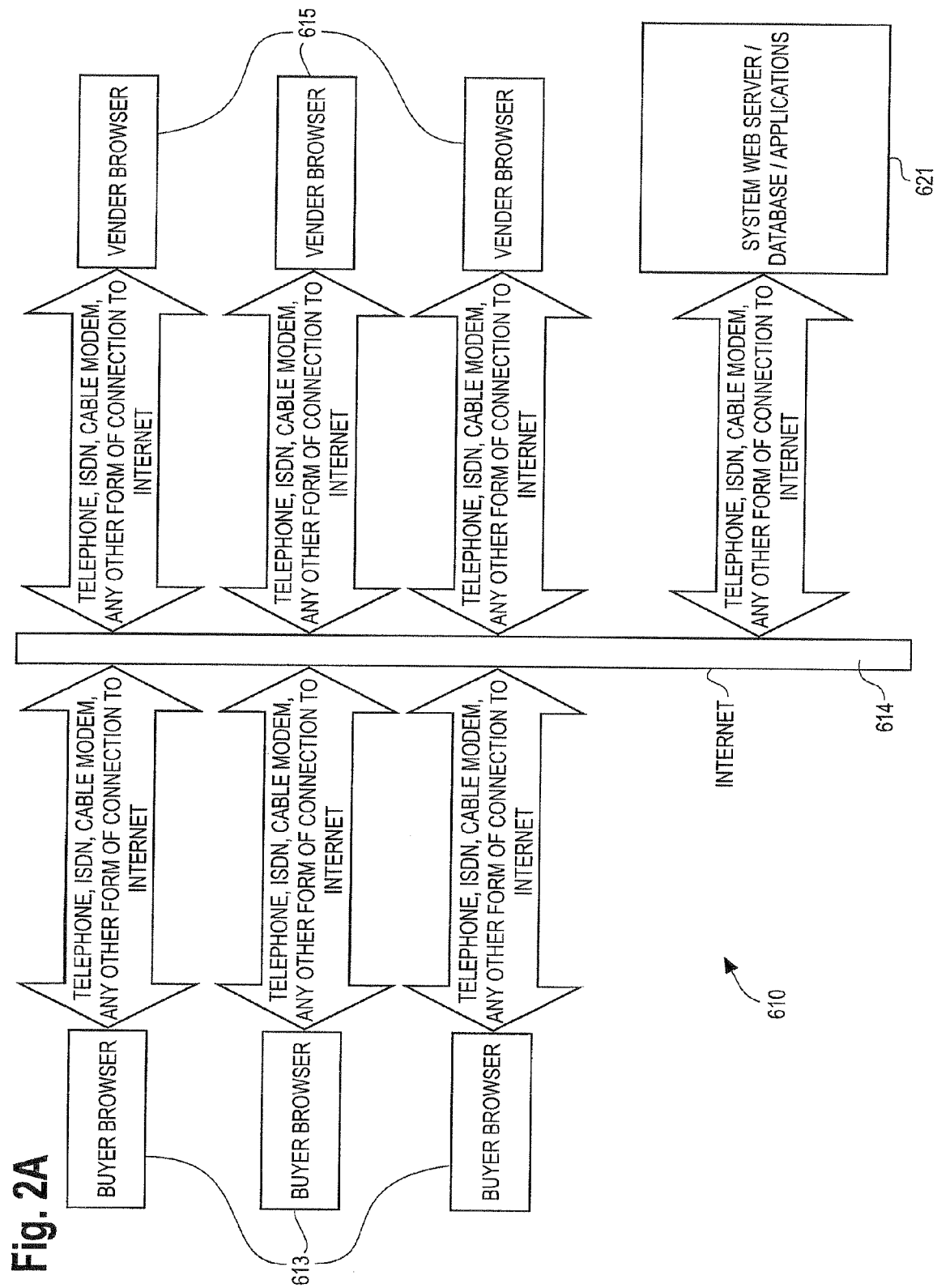
FIG. 2A shows an Internet-based arrangement of the system of FIGS. 1A and 1B.

FIGS. 1A and 1B set forth a first example embodiment of the present invention. Referring to FIG. 1A, a system database 2, which is resident on the data storage (not shown) associated with a conventional general purpose programmable computer (not shown), is connected to the Internet via a web site 4 resident on a conventional web server (not shown). In a preferred embodiment of the invention the buyer(s) 6 and the plurality of vendors 8 each access the web site 4 through respective Internet browsers such as, for example, Netscape or Internet Explorer. An example of such an arrangement is shown at FIG. 2A. It should be noted that the actual physical location of the computer(s) on which the web site 4 resides, and of the computer(s) (not shown) which perform the operations described below on the database 2 contents, and of the buyers' computers and the vendors' computers (not shown) are not prescribed by this invention. For example, the conventional general purpose programmable computer on which the database 2 resides may be co-located with, or can be located remote from the conventional web server (not shown) hosting the web site 4. Further, the database 2 may be resident on the computer (not shown) of the buyer 6, in which case the buyer 6 would access the database 2, through a web browser or equivalent means, or the database 2 would automatically access the buyer's computer and download the database contents.

This specific embodiment shown on FIG. 2A is particularly suitable for high-speed communications with a plurality of users operating in parallel. The system is illustrated with a functional diagram shown generally at 610. In this illustration, a plurality of entities having projects to be bid upon 613 are each individually connected to a common communication network such as the Internet 614. Potential bidders or product/service vendors 615 are similarly connected to the common communication network 614. This high-volume bid processing system shown at 621 is similarly connected to the common communication network 614. This high-volume bid processing system thus has access to communication with a large number of system users. This high-volume bid processing system is illustrated in greater detail below with reference to FIG. 2B.

As shown in FIG. 2B, an example embodiment of the high-volume bid processing system is shown generally at 710. In this example embodiment, one or more robust, high-capacity telecommunications lines 712, which for example may be T1 lines, provide access to the communication network 614, which as noted in the preferred embodiment is the Internet. The T1 lines are directly connected to one or more web server units 714. These web server units are capable of handling a plurality of transmission and reception operations simultaneously. The web server units also handle publication and transfer of the various web pages used with the system to the various system users that are connected through the Internet. The interconnection between the T1 lines and web servers is a conventional connection that may be scaled for increased volume. Specifically, additional T1 lines or web server units may be added as necessary to satisfy increases in user demand.

The web server units are connected to a pair of database servers 716 that are mirrored. The database servers 716 handle transfer and storage of all vendor and bid data used by the system as noted above. The database servers 716 are mirrored as generally known in the art in order to prevent degradation of system performance should one of the database servers cease to function properly. It will be appreciated that this particular embodiment of the system provides all of the users with ready access to information and a very simple and straightforward means for exchanging data. Extra database servers may also be added as needed in order to satisfy user demand.

Referring back to FIG. 1A, block 10 represents the entry by the vendors 8 of a set of vendor's attributes VATTR, each VATTR representing the name, geographical location and the manufacturing, production, and/or provider capabilities and other attributes of the one of the vendors 8 submitting it, which are quantified and entered into the system database by the vendors by way of the web site 4.

An example device for storing the system database containing the VATTR information is an Internet server running under Windows NT 4.0, with MS Internet Information Server 4.0, Oracle Database 7.3.4.0, and an information server using standard ".dll" files created in any of the standard programming languages known in the art, e.g., Delphi, MS Visual Basic, or C++, Java, all running on a conventional general purpose computer hardware, such as a PC compatible Eisa/Is a HAL (486 C Stepping) equipment or the like. An example of a specific embodiment, showing the graphical user interface, is described later in this specification in reference to FIGS. 3-14.

It should be noted that the entering of the vendors' attributes VATTR may also be performed via a manual entry of the information into the system database 2 and may also occur after a vendor has been accepted into a buyer's vendor base and begun bidding on jobs, for example, to reflect changes in the vendor's production capabilities or job preferences.

Referring to FIG. 1A at block 12, after receipt of a set of vendor attributes VATTR from a plurality of vendors 8, a buyer 6 inputs, by way of the web site 4, an invitation-for-bid data BIFBD, defining a customized good or service in terms of standardized buyer job attributes BATTR. The invitation-for-bid data BIFBD also defines any standard or optional selection criteria SC by which a vendor will be selected from among the plurality of vendors 8 and any additional vendors that the buyer 6 adds to the plurality of vendors 8 as part of the invitation-for-bid data BIFBD, as described below. The invitation-for-bid data BIFBD are quantified and entered by the buyer 6 in accordance with standard graphical user interface (GUI) prompts appearing on the particular display of the web site 4, an example of which is described in reference to FIGS. 3-14 below. The invitation-for-bid BIFBD defines the customized goods or services according to quantified values of standardized attributes so that each vendor 8 will understand what exact manufactured item or customized service is being placed out for bids by the buyer 6. This arrangement ensures that the bids are comparable and that mistakes as to the requirements of the buyer are minimized.

FIG. 1A, block 14 illustrates the step of retrieving all of the vendor attribute sets VATTR from the database 2 and comparing each to the job attributes BATTR derived from the invitation-for-bid data BIFBD based on the standard selection criteria SC (such as product category and quality level) previously entered by the buyer 6 as part of the job attributes BATTR. The comparison determines which of the vendors 8 are qualified to provide the requested customized goods or services. The comparison at block 14 also uses any optional selection criteria SC which the buyer 6 had entered as part of the job attributes BATTR (such as geographical location of the vendor, whether the vendor must be a union shop, small-disadvantaged business, or a minority- or women-owned business), and includes the names of specific vendors entered by the buyer 6 as part of the invitation-for-bid data BIFBD that the buyer wished to be given the opportunity, or not be given the opportunity, to bid on the job. Based on the results of the block 14 comparison a vendor selection pool VPOOL is created, and the formatted vendors' invitation-for-bid VIFB is then transmitted at block 16, via web site portal access, e-mail, or equivalent means, to each of the vendors represented by the vendor pool VPOOL.

Referring to FIG. 1B, at block 18 all of the vendors 8 in the vendor selection pool VPOOL of FIG. 1A that received the invitation-for-bid VIFB can submit, through the web site 4, a responding bid RBID(i), where "i" is an index or name value identifying the submitting vendor, having the ith vendor's fixed price quote or bid to manufacture, produce, and/or provide a manufactured item or customized service in accordance with the specifications designated by the buyer in its invitation-for-bid VIFB or alternative specifications requested or otherwise recommended by the submitting vendor. Each responding bid RBID(i) is stored in the database 2 in a responding bid file RFILE. Prior to award of the job, which is described below, only the buyer 6 has access to the RFILE, as shown at block 20. The buyer 6 can access RFILE through the web site 4, or through direct read of the database 2, if the database 2 is resident on the computer system (not shown) of the buyer 6. The RFILE list is preferably presented to the buyer 6 in rank order according to the bid price.

Referring again to FIG. 1B, at blocks 22 and 24 after the time of bid closing, the lowest price bid is identified as a system default selection and a WINBID information is transmitted or otherwise provided to the buyer 6 which: (i) identifies the lowest bidding vendor, and (ii) solicits the buyer for approval to accept bid RBID of the lowest bidding vendor. The buyer 6 then approves the lowest bidding vendor or overrides the default selection and approves another responding bidder (for example, based on a higher bid associated with alternative job specifications), in either case by visiting the web site 4 and inputting an APPROVAL data through its web site portal workspace, or by transmitting the data via e-mail or equivalent means to the computer. Upon receipt of the APPROVAL from the buyer 6 an ORDER is issued at block 26 to the winning vendor for the purchase of the customized goods or services specified by the invitation-for-bid VIFB (including any alternative specifications accepted by the buyer), at the price bid by the winning vendor among the vendors 8. If, on the other hand, the APPROVAL is not received, or if a corresponding data (not shown) indicating no approval is received, the process goes to block 28 by which the invitation-for-bid is cancelled or reissued (in which event, the process reverts to block 6). It should be noted that depending on the particular design choice, and on the resolution of possible legal issues (such as the validity of digital signatures), a separate formality, such as a letter of acceptance or a phone discussion between the buyer 6 and the winning vendor 8, may be used or required before actual award of the bid, or before the commencing of work on the job. For purposes of this description, though, receipt of APPROVAL is sufficient. In the event that the separate formality is required, this would be carried out before moving to the block 30 described below.

After the ORDER is issued the system goes to block 30 which disseminates via web site portal access, e-mail, or equivalent means, a BIDINFO data to all of the vendors 8 in the vendor selection pool VPOOL who submitted bids, the BIDINFO data representing the identity of the selected vendor and the identity and rank order value of the bids submitted by all of the vendors 8. After the ORDER is transmitted at block 26, the system makes the BIDINFO data accessible by Internet portal to all vendors 8 in the vendor selection pool VPOOL who did not submit bids in response to the invitation-for-bid VIFB. Also after the ORDER is transmitted at block 26, either concurrent with or before or after the BIDINFO is transmitted, the system goes to block 32 and generates a set of job milestones MSTONES, which are transmitted to the buyer 6, in reverse scheduling format. The milestones MSTONES are calculated based on the buyer's job attributes BATTR associated with the particular item(s) to be manufactured or customized service(s) to be provided. The milestones MSTONES are then entered into a database (not shown) that may be associated with a general purpose programmable computer (not shown) of the buyer 6 which generates screen alerts, at block 34, on the winning vendor's web site portal workspace (not shown) at time points specified by the milestones MSTONES. The winning vendor 8 must then confirm on its web site portal workspace that the work requirements associated with each milestone MSTONE have been completed as they have become due. If the completion of each milestone MSTONE is not confirmed as they become due, then the system presumes that the milestone MSTONE was not completed when due and generates a screen alert, at block 36, on the buyer's 6 web site portal workspace (not shown) that no confirmation of the completion of the milestone MSTONE has been received. The buyer 6 is thereby alerted (i) to check for any messages transmitted through the system from the winning vendor 8 to the buyer 6 explaining why the milestone MSTONE was not completed when due, or (ii) if no such message was transmitted, to contact the winning vendor 8 directly by telephone, e-mail, or equivalent means to determine if the job is on schedule or take such steps as may be necessary if the job is not on schedule. In any event, the winning vendor 8 proceeds to manufacture, produce, and/or provide the buyer-required manufactured item or customized service, and then to ship the manufactured item or provide the customized service as instructed by buyer 6.

Referring to FIG. 1C, block 38, upon confirmation by the vendor 8 that the job has been completed, the system generates an automatic vendor payment invoice that contains any approved contract modifications at the vendor's 8 web site portal workspace. Alternatively, the vendor payment invoice could be transmitted to the vendor 8 by other forms of communication such as e-mail, facsimile, or equivalent means. In the embodiment using a web site portal, the vendor 8 confirms the vendor payment invoice with a digital signature, at block 40, and the buyer 8 is then alerted on its web site portal workspace, at block 42, that the vendor payment invoice is ready for review, approval, and payment, at block 44, in accordance with the terms of the invitation-for-bid VIFB. For this embodiment, no fee for using the system is added to the vendor payment invoice, and the vendor 8 receives payment directly from the buyer 6, outside the system, at block 46 by electronic funds transfer (EFT) or physical means. An alternate embodiment for transmitting payment to the vendor 8 through the system is set out in FIG. 1C at block 48. For this embodiment, payment for all buyer 6 jobs is made by electronic funds transfer (EFT) or physical means to a single escrow account, at block 48, managed by the system to provide the buyer with single source accounting. Payment is then made to the vendor 8 from the escrow account, at block 50, by electronic funds transfer (EFT) or physical means.

A further alternate embodiment for invoice payment is set forth at FIG. 1D. Referring to FIG. 1D, at blocks 52 and 54, a vendor payment invoice is generated upon job completion and approved by the vendor 6, in the same manner described above with respect to FIG. 1C, at blocks 38 and 40. Prior to invoice approval by the buyer 6, at block 56, however, a job transaction fee is added to the invoice as payment for the cost of using the system allocated for each job. Payment of the buyer-approved invoice, at block 58, is then made to the system's single source escrow account, at block 60, in the same manner described above with respect to FIG. 1C, at blocks 44 and 48. Upon receipt of funds into the escrow account, the system allocates and distributes the job transaction fee to a system administration account, at block 62, and payment for the job to the vendor 8, at block 64. Transfer of these funds to the system administration account and the vendor 8 is made by electronic funds transfer (EFT) or physical means in the same manner as described above with respect to FIG. 1C, at block 50.

The invention and its operation are described above without limitation to specific application. Example applications include customized printed goods, digitally mastered CDs or DVDs, machine tools, furniture, engraved wares, and insurance, in which jobs are awarded on a competitive or "bid" basis.

Referring to FIGS. 3-14, an example of the present invention applied to print procurement will be described. It will be readily understood to one of ordinary skill in the art, however, that the print procurement example is only an example application of the system and method of the present invention, and that the present invention can be applied to other types of competitive bidding on customized goods and services. The function of this example embodiment is to match a printing vendor, these being a specific example of the above-described vendors 8, to a print job based on requirements input by the print buyer, which is a specific example of the above-described buyer 6.

For this description it is assumed that the vendor attributes VATTR described in reference to FIGS. 1A and 1B, a set from each of a plurality of print vendors 8, have already been entered into the database 2, at the direction and with the consent of the print buyer 6 and that no additional vendors are added as part of the invitation-for-bid data BIFBD. The print vendors 8 enter their respective vendor attributes VATTR by visiting the web site 4 and using the vendor's web browser (not shown), e.g., Netscape, in a mode and manner substantially identical to the process described below by which the print buyer 6 enters the buyer attributes BATTR describing the particular print job for which bids will be requested. Alternatively, the print vendors 8 can transmit their respective vendor attributes VATTR to the print buyer 6 by e-mail or equivalent means for entry by the print buyers 6 or any authorized third party.

Figure 3:
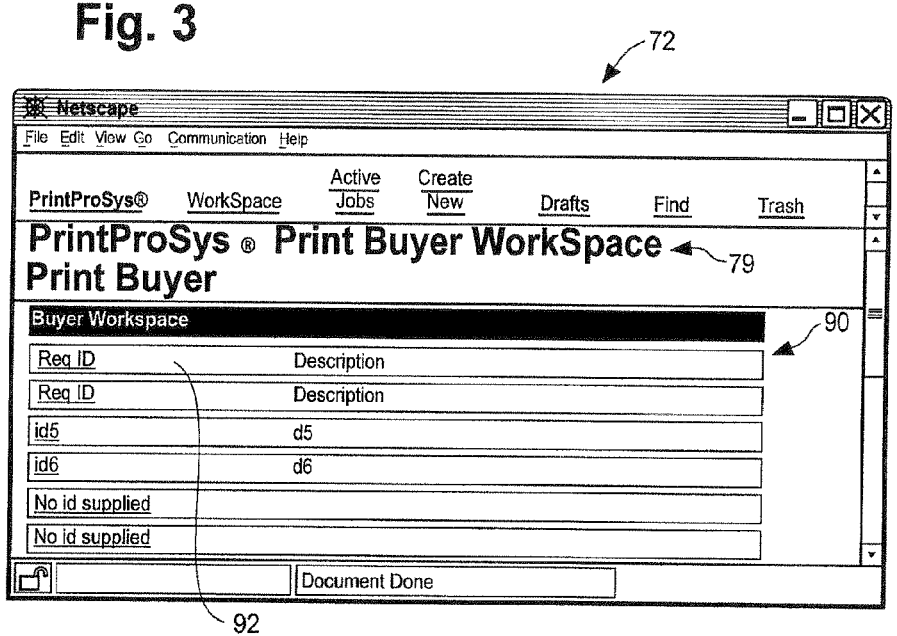
FIGS. 3-14 show screen displays used in connection with a specific embodiment of a print procurement application of the present invention.

Referring to FIGS. 1A, 1B, and FIG. 2A, the print buyer 6 begins its interaction with the system by logging onto the system web site 4 using a Netscape or equivalent browser. The web site 4 and the buyer's 6 browser 12 are also referenced herein as the buyer's "quantification means". Referring to FIG. 1A, buyer 6 logs onto the web site 4 with a unique user name and password, thus ensuring that the data entered is unique to that user. Once logged in, print buyer 6 moves to his or her individual web site portal workspace 72, and the first page of the workspace is shown at FIG. 3. The buyer 6 then clicks on the FIG. 3 hyperlink point labeled as "Create New", using a suitable pointing device (e.g., a mouse, roller ball, track pad, or equivalent) to create a new print job. Upon clicking this hyperlink, print buyer 6 is presented with a clear, easy-to-read form such as that shown at FIG. 4. Print buyer 6 has available to it a "back" button to go back to the hyperlink point from which any page is accessed. An example system supporting the particular example of the web site 4 represented by FIGS. 3-14, is Windows NT 4.0, using MS Internet Information Server 4.0, Oracle Database 7.3.4.0, and an information server using standard ".dll" files created in any of the standard programming languages known in the art, e.g., Delphi, MS Visual Basic, C++, or Java, all running on a conventional general purpose computer hardware, such as, a PC compatible Eisa/Isa HAL (486 C Stepping) equipment or the like.

Figure 4:
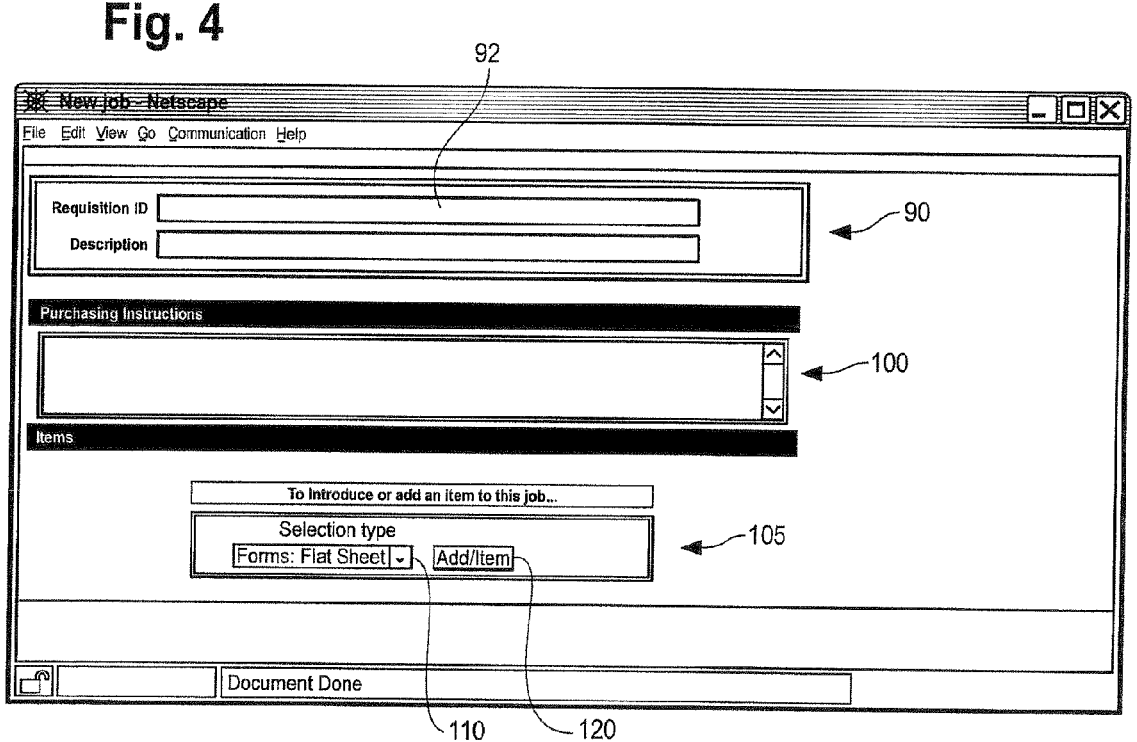

Referring to FIG. 4, it is seen that the field at the top of the screen is the master ID and description area 90. Within this field, print buyer 6 may give a print job an identifier or name 92. A purchasing instructions field 100 is shown arranged beneath the ID/description area 90. Print buyer 6 utilizes the purchasing instructions field 100 to inform prospective print vendors 8 of any special instructions related to print job.

Figure 5:
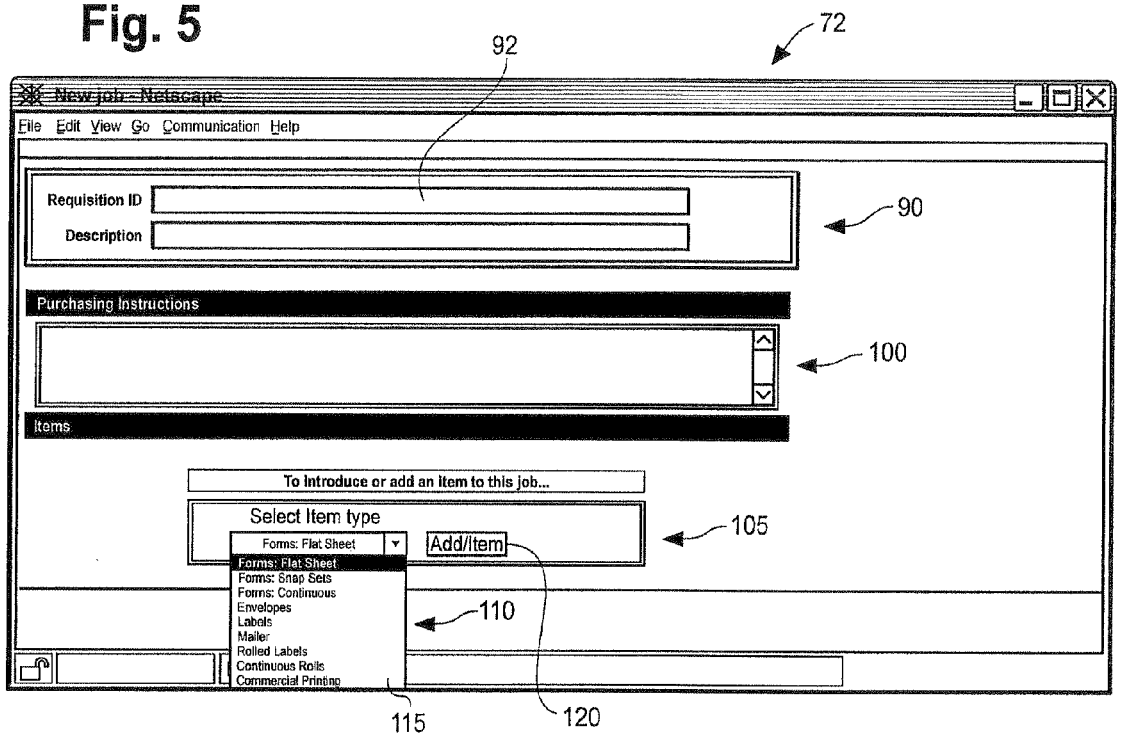

Referring to FIG. 5, the buyer 6 next inserts the item for which a bid is to be requested, or adds another item to an existing list, by clicking on a drop-down menu 110 whereupon a list of possible options 115 is presented. The information entered through the screens of FIGS. 5-14 is a specific example of the buyer attributes BATTR described in reference to FIGS. 1A and 1B above. Referring to FIG. 5, print buyer 6 selects from the list of options 115 on the basis of the particular set of needs and requirements associated with the print job to be quantified. When print buyer 6 selects an option 115 that best matches its printing needs, the "add item" button 120 is clicked, via the pointing device.

Figure 6:
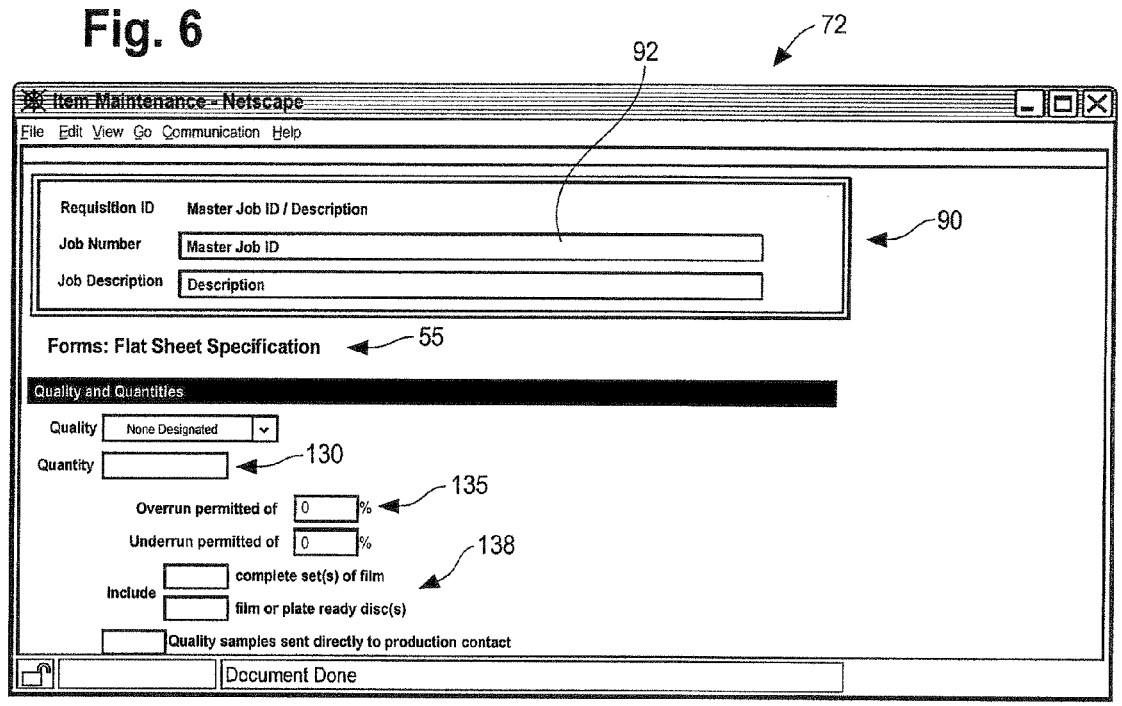

Clicking the add item button 120, moves the buyer to a new screen, shown at FIG. 6, requesting additional information more specific to the added item of the print job. If print buyer 6 inadvertently clicks the "add item" button 120 and selects an option that does not match its needs, the print buyer 6 may scroll to the bottom of the page and activate a "delete" button (not shown). Print buyer 6 will then be presented with the previous FIG. 5, screen to introduce a correct job item.

Assuming that the "add item" button at FIG. 5, was clicked to correctly select "flat sheets", the buyer 6 is presented with the example screen of FIG. 6 requesting entry into a "Master Job ID/Description" field 90, including a "job number" 92 and "job description" (not numbered). The print buyer 6 can also select the required job quality (not numbered) from the "quality" scroll down, which provides "none designated" as an option, as depicted at FIG. 6. The FIG. 6 screen provides a "quantity" area 130 so that print buyer 6 may enter the total number of units to be manufactured. For this example, print buyer 6 also supplies the "overrun permitted" and/or "underrun permitted" as a percentage in fields 135. The FIG. 6 screen provides entry, at field 138, of additional "complete set(s) of film" and "film or plate ready disc(s)".

Figure 7:
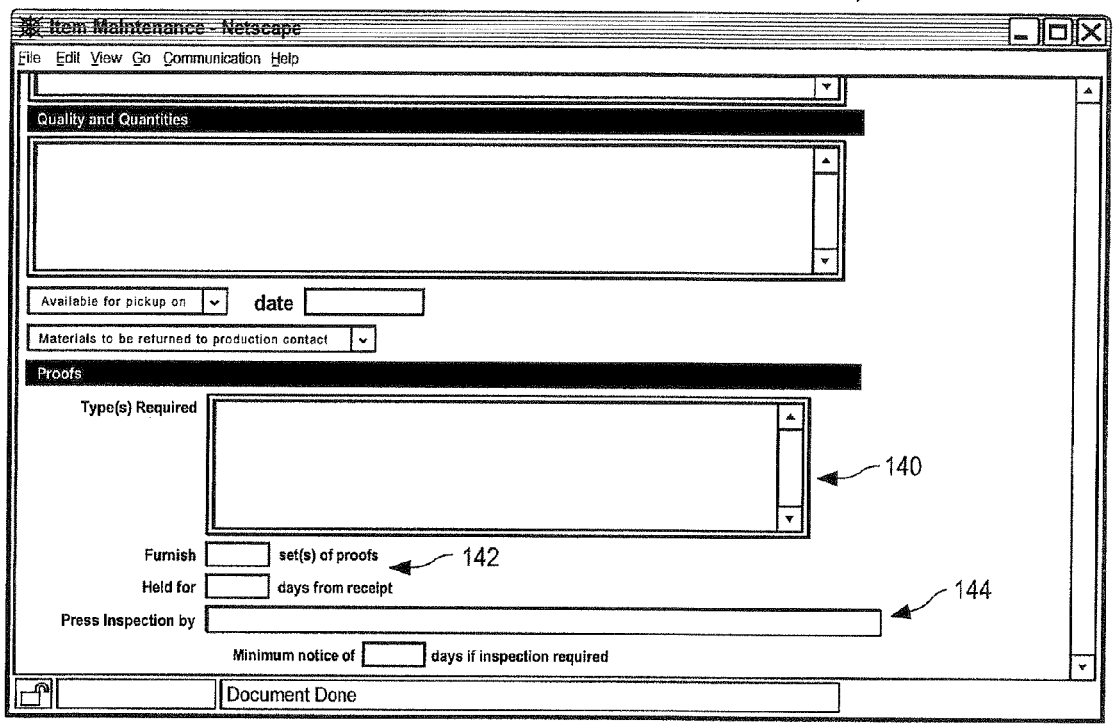

After the data entry screen of FIG. 6 is completed, the buyer's browser, in this example of adding an order for "flat sheet", moves to the web page or screen depicted at FIG. 7. The FIG. 7 example screen includes a proof area 140 which allows print buyer 6 to enter information about types of proofs 142 required and inspection requirements 144.

Figure 8:
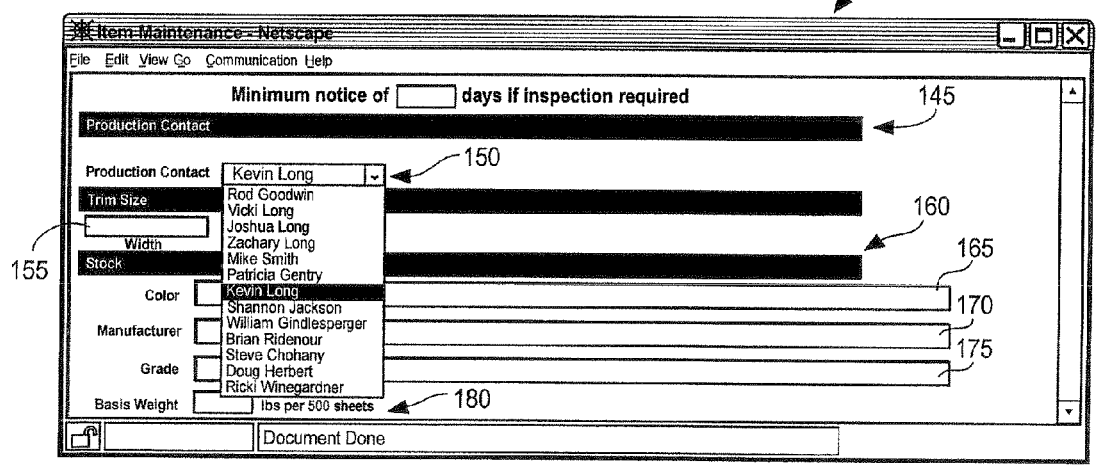

After completion of the example screen of FIG. 7, the buyer 6 is presented with the example screen of FIG. 8. Near the top of the FIG. 8 screen example is a "production contact" area 145 with a drop-down menu that allows print buyer 6 to choose from a list of production contacts, an example being shown as item 150. For this example, the print buyer 6 then moves down to the trim field 155 to define the width and type of trimming operation required for the example flat sheet order. This portion of the FIG. 8 example screen is shown in greater detail at FIG. 9. The detailed example screen of FIG. 9 includes a "stock" field 160 for the print buyer 6 to enter the type of paper stock required for the job, as well as a "color" 165, "manufacturer" 170, "grade" 175 selections, "basis weight" 180 and "basis size" 185. In the particular example screen detailed at FIG. 9, the print buyer 6 is provided with a field 188 allowing him or her to specify whether substitutes, such as recycled paper, are allowed.

Figure 9:
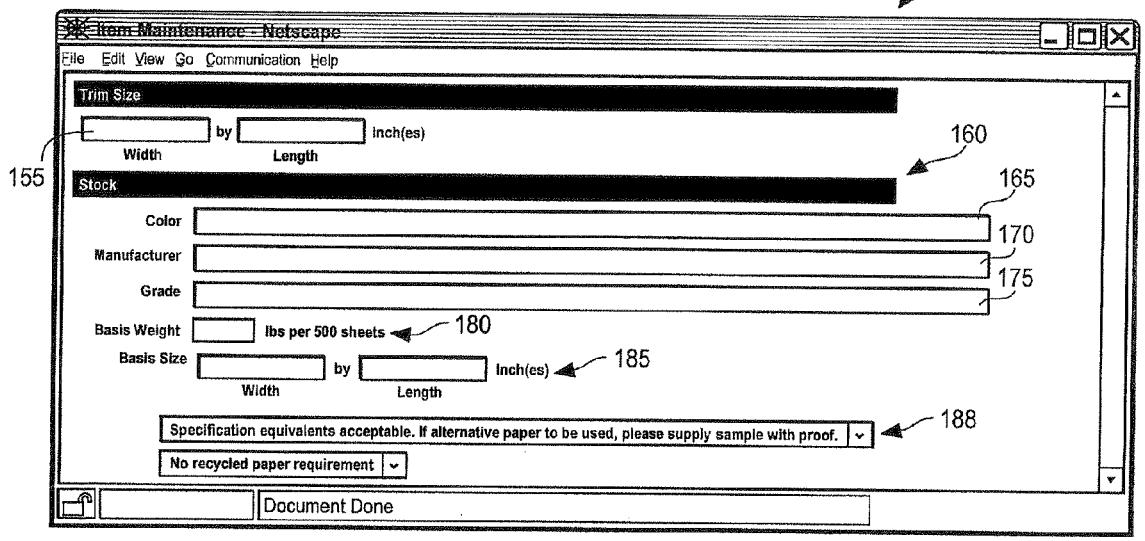
Figure 10:
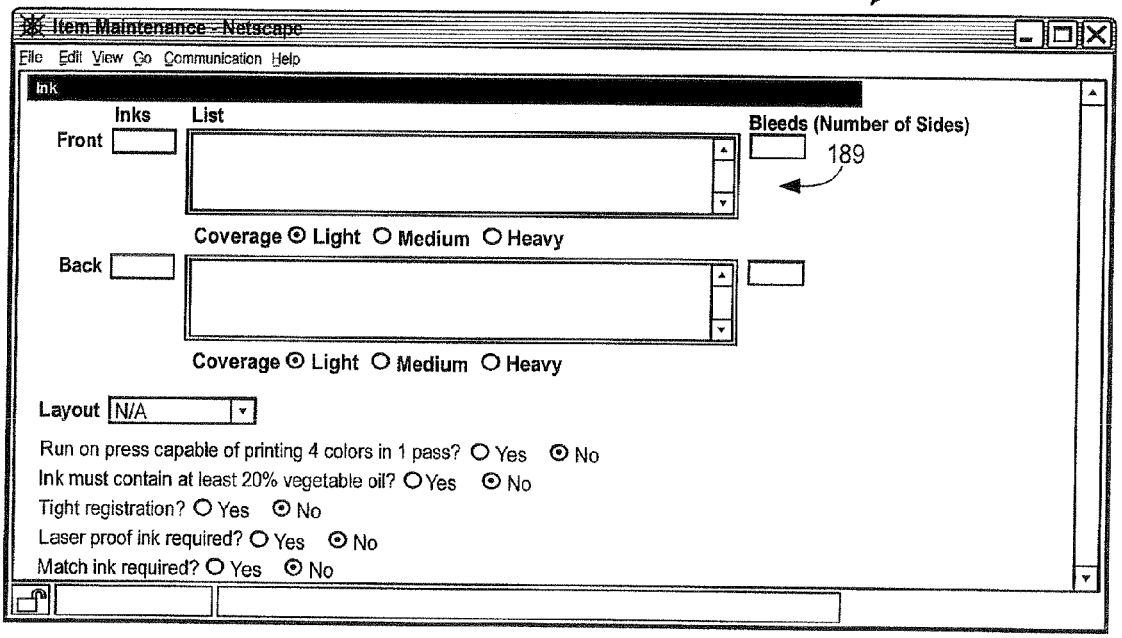

For this print procurement example, the buyer 6, after completing the FIG. 9 screen, is presented with the fields for entering the ink specification data, by a screen such as that shown at FIG. 10. The FIG. 10 example provides the print buyer 6 with a field 189 for the selection of ink for front and back of the flat sheet, with a set of "radio buttons" for entering "Coverage" as "Light", "Medium" or "Heavy", and with a set of "yes" or "no" buttons specifying additional requirements for the materials and the process of manufacture.

Figure 11:
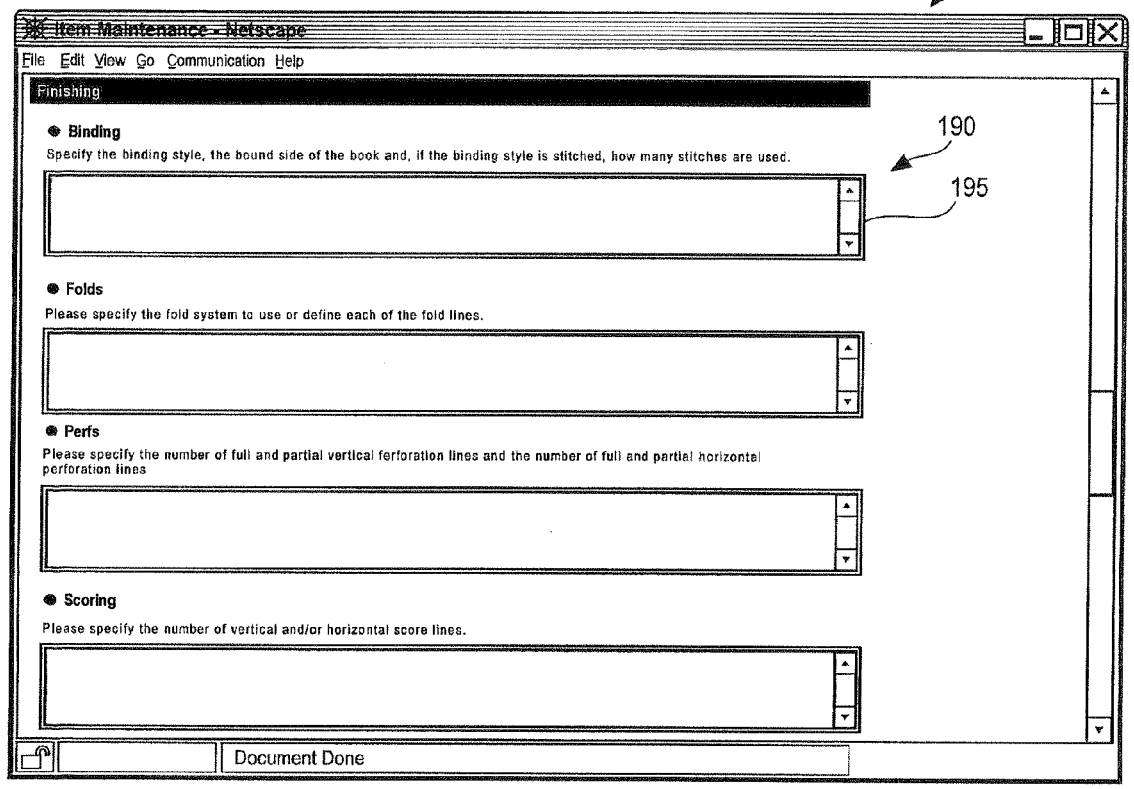
Figure 12:
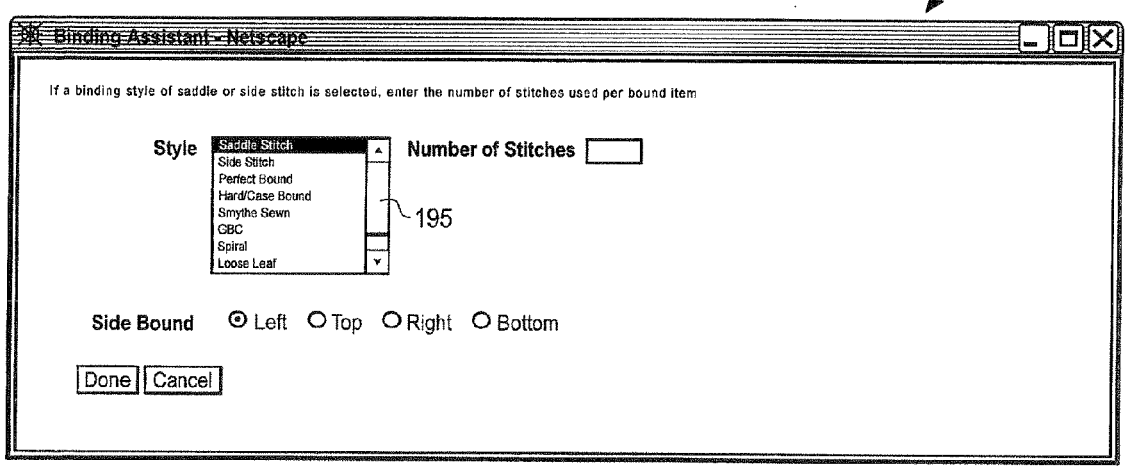
Figure 13:
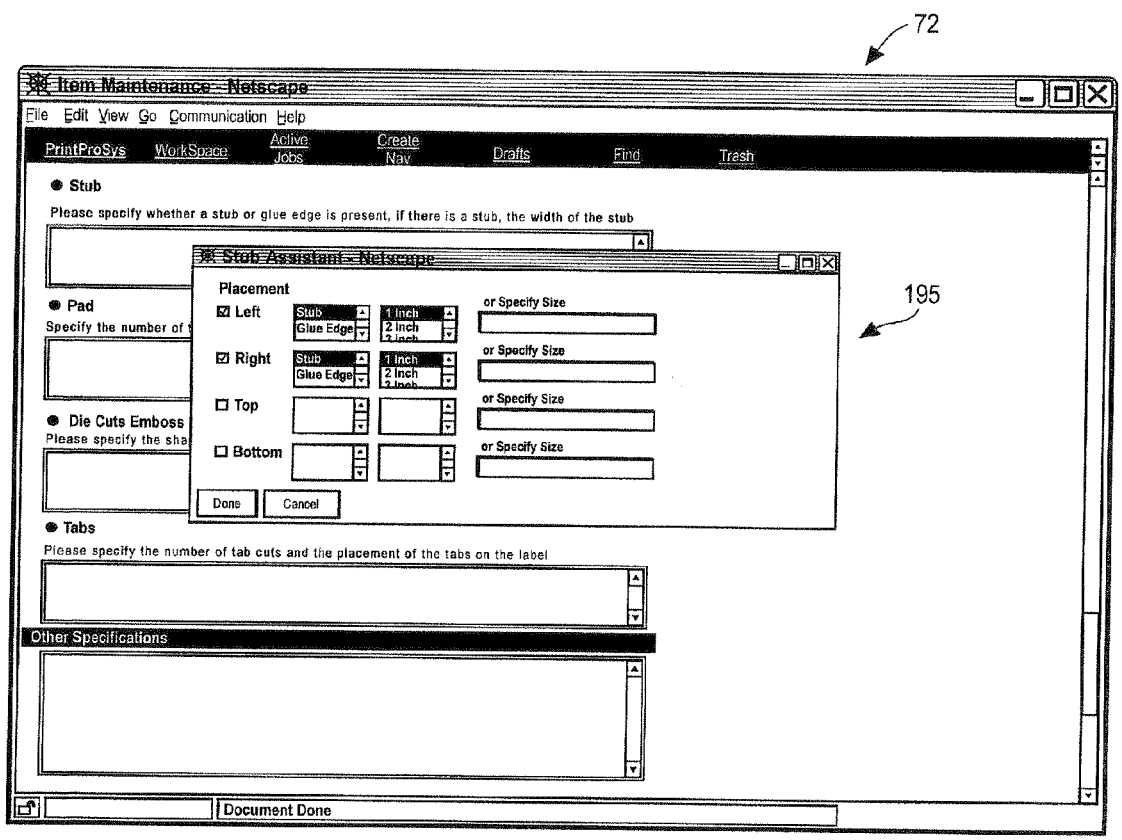
Figure 14:
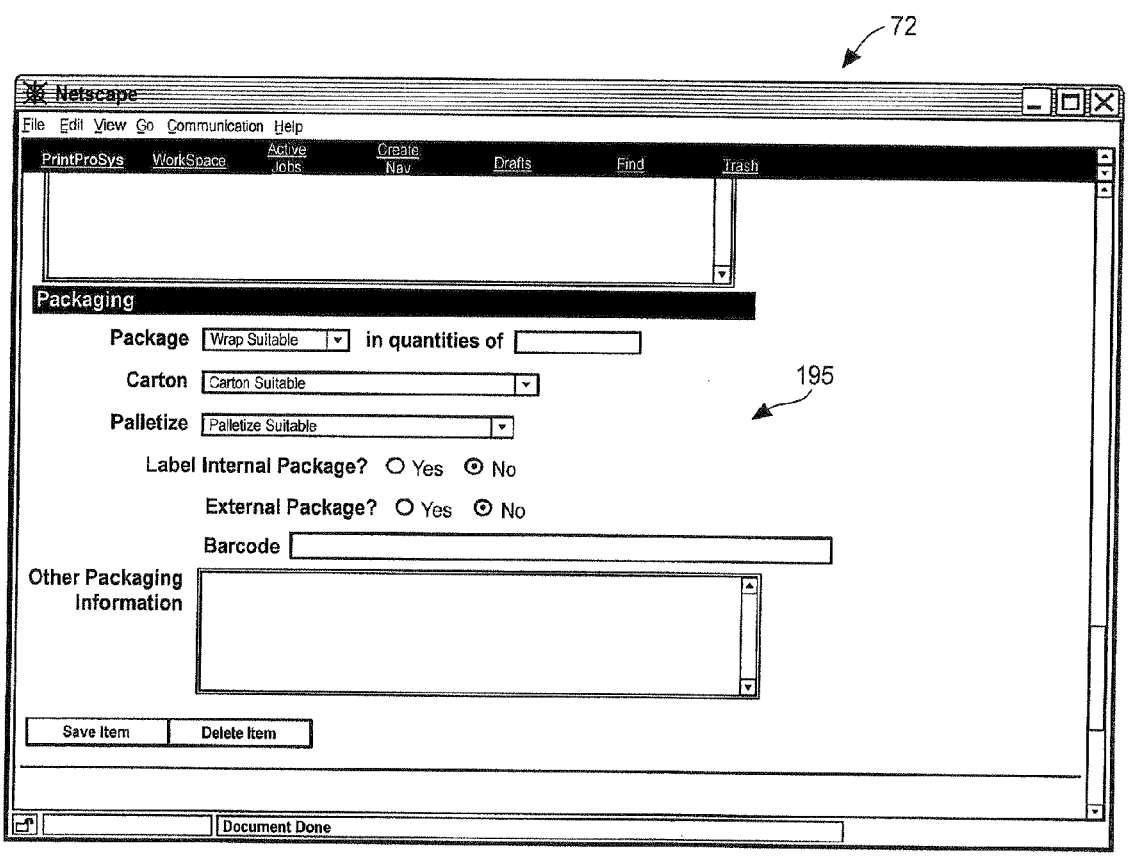

Next, at FIG. 11, the print buyer 6 is guided through a series of options related to the finishing of the flat sheet printed item. Each finish option 190 is associated with a small "pop-up" screen 195 that acts as an assistant to guide the print buyer 6 through the process of identifying and specifying the specific finishing requirements. Each pop-up assistant 195 provides print buyer 6 with choices of several options specific to particular types of finishes. Referring to FIG. 12, a detailed view of an example "pop-up" screen 195 is presented to the buyer 6, having a pull down menu of available stitching options. If the buyer 6 clicks on the example highlighted at FIG. 12, which is "Saddle Stitch", he or she is presented with another "pop-up" screen such as that shown at FIG. 13. FIG. 14 shows another finishing set of finishing options 195, defining the packaging requirements for the print job. Other attributes associated with a particular print job include binding, folding, perforations, scoring, punching, numbering, bar coding, and collation.

Referring to FIGS. 1A and 1B, after the buyer 6 enters the data into the example screens of FIGS. 3-14 describing the job, the buyer 6 clicks on a "submit invitation-for-bid" button on the screen (not shown) and, in response, the system generates the buyer's invitation-for-bid data BIFBD, and the system commences the processing indicated at block 12. More specifically, the system receives the invitation-for-bid data BIFBD, and extracts the buyer's attributes BATTR from the information entered by the screens of FIGS. 3-14, and then compares those attributes to each of the plurality of sets of print vendor's attributes VATTR, using as the selection criteria SC for generating the vendor pool VPOOL the standard selection criteria SC entered by the buyer 6 along with the buyer's job attributes BATTR (such as product category and quality level) and any additional optional selection criteria SC (such as geographical limits or whether the vendor must be a union shop, small-disadvantaged business, or a minority- or women-owned business), specified by the buyer 6.

After the print vendor selection pool VPOOL is created by the system, the vendors' invitation-for-bid VIFB is submitted to each print vendor therein. The vendors' invitation-for-bid VIFB provides a specification for the printed item (e.g., paper focus, snap sets, envelopes, labels, rolled labels, magazines/booklets, etc.) presented in a faun that is derived from the quantified set of print buyer's job attributes BATTR so that each print vendor 8 will understand the exact item or service is being placed out for bids by the print buyer 6. This arrangement ensures that the bids are comparable and that mistakes as to the requirements of print buyer 6 are minimized.

As described above with reference to FIG. 1B and the general embodiment of this invention, all of the print vendors 8 in the vendor selection pool VPOOL of FIG. 1A that received the invitation-for-bid VIFB can submit, through the web site 4, a responding bid RBID(i) having the i.sup.th vendor's price quote or bid on the print job specified by VIFB. In this example embodiment for procuring print jobs, the responding bids RBID do not contain any alternative specifications requested or otherwise recommending by the submitting vendors and are stored in the database 2 in a responding bid file RFILE which is accessible by, or provided to the print buyer 6, preferably presented to the print buyer 6 in rank order according to the bid price. After the time of bid closing the lowest price bid is identified as a system default selection and a WINBID information is transmitted or otherwise provided to the print buyer 6 which: (i) identifies the lowest bidding vendor, and (ii) solicits the print buyer for approval to accept the bid RBID of the lowest bidding vendor. The print buyer 6 then approves the lowest bidding vendor or overrides the default selection and approves another responding bidder, in either case by visiting the web site 4 and inputting an APPROVAL data through its web site portal workspace. Upon receipt of the APPROVAL from the print buyer 6 an ORDER is issued at block 26 to the selected print vendor by web site portal access, e-mail, or equivalent means to provide the printed goods or services specified by the invitation-for-bid, at the price bid by the winning vendor.

After the ORDER is issued the system goes to block 30 which transmits, via web site portal access, e-mail, or equivalent means, a BIDINFO data to all of the print vendors 8 in the vendor selection pool VPOOL who submitted bids, the BIDINFO data representing the identity of the selected print vendor and the identity and rank order value of their bids. After the ORDER is transmitted, the system makes the BIDINFO data accessible by web site portal access to all vendors 8 in the vendor selection pool VPOOL who did not submit bids. Then, at block 32 a set of job milestones MSTONES are generated and transmitted to the print buyer 6, in reverse scheduling format, based on the job attributes BATTR associated with the particular print item(s) to be provided. As each milestone MSTONE becomes due (e.g. pick-up of buyer-furnished material, delivery of proofs, required press sheet inspections, partial and complete shipments of final product), an alert is generated, at block 34, on the print vendor's web site portal workspace (not shown). The print vendor 8 must then confirm on its web site portal workspace that each task associated with the alerted milestone MSTONE has been completed. If the completion of the alerted milestone MSTONE is not confirmed by the print vendor 8, then the system generates a screen alert, at block 36, on the buyer's 6 web site portal workspace (not shown) that no confirmation of the completion of the milestone MSTONE has been received. The buyer 6 is thereby alerted (i) to check the system for any messages from the print vendor 8 explaining why the milestone MSTONE was not completed when due, or (ii) if no such message was transmitted, to contact the print vendor 8 directly by telephone, e-mail, or equivalent means to determine if the job is on schedule or take such steps as may be necessary if the job has been delayed. In this manner, the system automatically tracks the job's progress until the print vendor 8 completes the job by producing and/or providing the specified print item(s) and ships them as specified by the invitation-for-bid VIFB.

Upon completion the winning print vendor 8 confirms that the job has been delivered, and the system generates an automatic invoice that contains any approved contract modifications at the vendor's web site portal workspace. The winning vendor 8 confirms the invoice with a digital signature, and the buyer is then alerted on its web site portal workspace that the invoice is ready for review, approval, and payment in accordance with the terms of the invitation-for-bid VIFB. For this example embodiment, it is assumed that the buyer has chosen to pay a job transaction fee for use of the system with single source accounting for all of its solicited printed jobs. Referring to FIG. 1D, the job transaction fee is added to the vendor payment invoice shown on the buyer's 6 web site portal workspace prior to the buyer's 6 approval, at block 56. Payment of the buyer-approved invoice, at block 58, is then made to the system's single source escrow account, at block 60, by electronic funds transfer (EFT) or physical means. Upon receipt of funds into the escrow account, the system allocates and distributes, again by electronic funds transfer (EFT) or physical means, the job transaction fee to a system administration account, at block 62, and payment for the job to the vendor 8, at block 64.

Those skilled in the art will appreciate that the specific embodiments set forth above are for purposes of example only and the invention may be practiced with a wide range of alternate structures. For example, referring to FIG. 15, the present invention contemplates alternative memory and processor structures and connections between these structures, using a generic external data link instead of the vendor web browser 10, buyer web browser 12, web site 4 and database 2 depicted at FIG. 1B.

Figure 15:
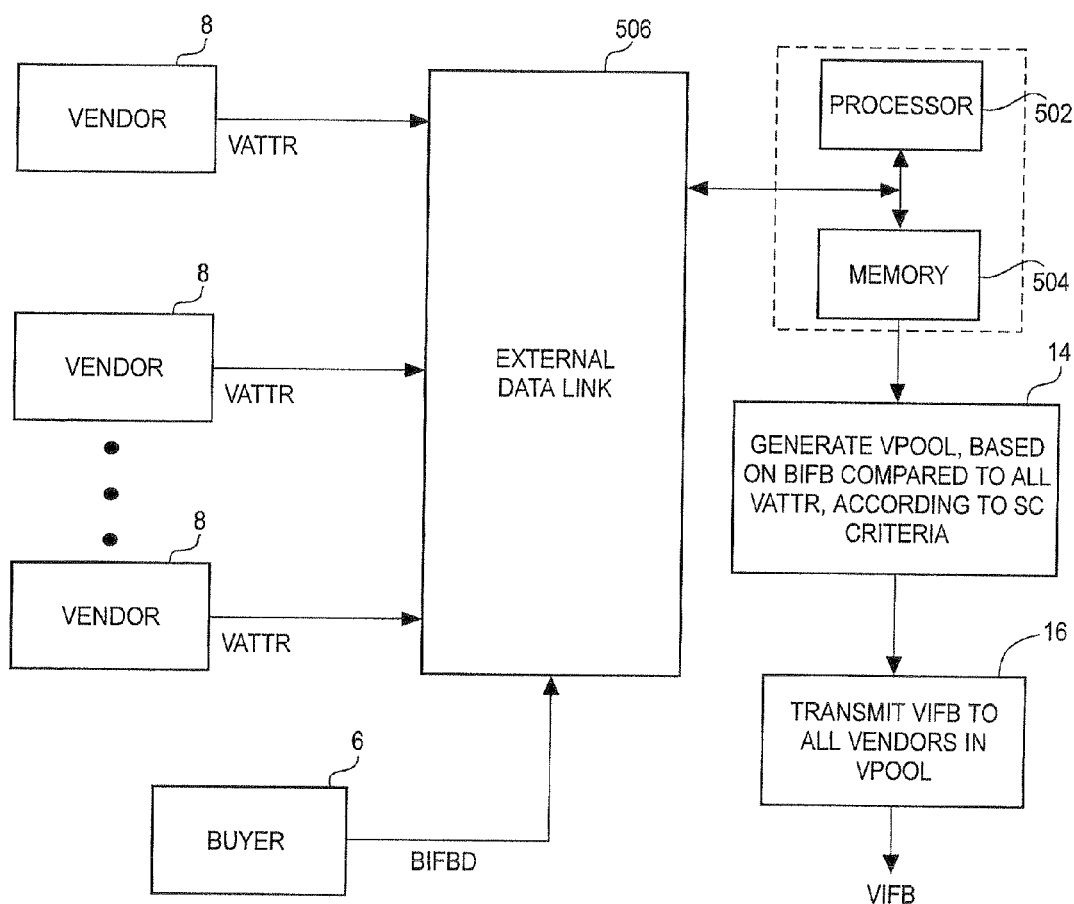
FIG. 15 shows a general embodiment of the communications system of FIG. 1A.

As shown in FIG. 15, the database 2 of FIG. 1B may reside on a processor 502 with access to a memory 504. The processor may be one associated with a personal computer or workstation, for example. The memory 504 may be dedicated to the personal computer or workstation. However, the memory 504 may actually be comprised of one or more distinct memory units which may be, for example, random access memory (RAM), EEPROM, floppy disc drives or hard drives. In such an embodiment, these separate memory units are simply linked to the processor via a data bus or other known transmission link.

The memory 504 preferably receives data from an external data link 506. The data may be routed to the memory via the processor 502 or through some other data bus or other known transmission link. The external data link 506 may be a connection via the Internet, through e-mail or some other alternate sources for data transfer. For example, the data transfer represented could be accomplished by automated facsimile reception and downloading of data through optical character recognition, or through voice recognition-to-text. The data that is stored in the memory will typically include the request for bid data used in the claimed process BIFB, the received bids RBID, as well as the vendor job attributes VATTR.

Thus, in this alternate embodiment of the present invention, the bid data may be received in a variety of different formats for the convenience of all system users. System users are thus not limited to access through a web interface. This facilitates a much simpler use of the system because users may phone in the required information; send it via e-mail, or even by facsimile. Once a solicitation for bid information has been transmitted by the overall system operator, bid data may be received through the various forms of communications noted above.

The bid data is then transferred and stored in the memory 504. As with the previous embodiments, the processor then identifies the appropriate bid satisfying all the necessary requirements and which also has the lowest bid value. The ultimate selection information may be then transmitted to each of the bidders or may be maintained in secrecy.

In yet a further advanced form of the system, a plurality of jobs may be processed simultaneously. In this regard, separate computer processors with separate dedicated memory units may be associated with each of several distinct jobs. Alternately, a single computer may receive bid data from a plurality of sources that are then categorized or tagged in the memory for the respective jobs to be bid on. The processor will then be able to identify the lowest bid for a particular project once the closing date and time has passed. This is accomplished by examining stored bid data associated with a particular project based on the categorization or further information tag.

It will be recognized by those skilled in the art that the embodiment described above is compatible with the alternate communications devices previously described. Specifically, other computer systems that are programmed to send and receive data in other formats may also be linked with the database servers to provide more flexibility for the overall system. In that regard, computers that are dedicated to received vendor bid information or other data to be used by the system via facsimile, voice, or electronic mail may be linked directly with the database servers in order to transfer this information to the database servers automatically. Any number of computers could be connected in this manner to enable the system to automatically and simultaneously receive voice, facsimile, or electronic mail data and transfer this information to the appropriate file locations on the database servers. For example, in such a version of the system, the vendor bid data could be received over the Internet or via any of the over communication media described above. It is also contemplated that yet additional forms of communication may be used by the system in order to create yet greater flexibility for the system.

ADVANTAGES OF THE INVENTION

As can be readily determined by one of ordinary skill in the art of procuring customized goods and services, numerous advantages are obtained by employing the present invention. First, the invention enables the buyer to manage a large vendor base without costly administrative burdens so that the buyer's purchasing personnel can focus on budget planning, job preparation, internal customer service needs, production quality, and contract compliance.

The invention accomplishes this goal, initially, by quantifying both the buyer's procurement needs and the vendors' attributes in a database system that matches objective product specifications with pre-determined vendor quality levels and manufacturing, production, or provider capabilities for each approved vendor.

The buyer sets the parameters for both vendor pool selection and the bidding and award process so that vendor quality and responsibility can be determined at the time each buyer's vendor base is established. In this manner the system eliminates time-consuming assessments of the quality or capability of each bidder each time an individual job is solicited. At the same time, the invention obviates the need to make judgments about the responsiveness of the bids after they have been submitted. Significantly, the invention is not a posting system. Rather it is a procurement system in which the buyer can create and manage a single pool of vendors who are given specific production category and quality level ratings that, together with other selection criteria, automatically designate which solicitations each vendor in the pool can receive and bid.

Moreover, the specification writing and bidding and award processes are standardized so as to make the preparation and dissemination of solicitations, the receipt of quotes or bids, and the award of the job to the lowest responsive and responsible bidder virtually automatic and without the need for additional procurement staff or the expenditure of related out-of pocket administrative costs typically associated with comparing or evaluating a multitude of vendor bids.

In addition, the process of monitoring production is enhanced and simplified by the embodiment of the invention that automatically creates a detailed set of production milestones in reverse schedule format. These production milestones then become the focal point for an ongoing dialogue prompted by automatic system alerts about the job's progress among the buyer's procurement personnel, the buyer's end-users or other constituent elements, and each participating vendor, using the system's network of web site portal communication links.

Yet another embodiment of the invention provides a single source accounting method for buyers dealing with a plurality of vendors, while allocating fees associated with using the system to each individual job, which further simplifies and lowers the cost of the administrative process. This embodiment receives an invoice data from the winning print vendor upon completion of the job and generates, for the buyer's approval, a corresponding invoice at the buyer's web site portal workspace that adds a job transaction fee to the payment amount requested by the vendor. Upon approval, the system can prepare the invoice data for direct transmission to the buyer's accounting system for proper allocation of costs within the buyer entity and the electronic transfer of funds from the buyer based on the buyer-approved invoice into a single escrow account that serves as the accounts payable destination for all of the buyer's vendor payments. The system can then allocate and distribute the deposited amount by transmitting the job transaction fee to a system administration account, and transmitting the remainder from the escrow account to the winning vendor.

Second, the invention has many built-in features that help ensure quality control and contract compliance. The emphasis on quality control begins at the pre-qualification stage when vendor pools are established, rather than at the time of job award. This emphasis is underscored by the vendor's knowledge that poor quality or untimely delivery may result in the vendor being removed from the buyer's vendor base and the inability to bid on that buyer's future jobs.

Quality control is further enhanced by the buyer's use of the invention's specification-writing features to create precise detailed production specifications that objectively define the buyer's manufacturing and quality expectations. The comprehensive, easy-to-use computerized specification writing tools associated with the invention, in effect, free the buyer from dependency on the vendor's specialized product knowledge. As a result, the buyer is now able to procure based on objective specifications that reflect the buyer's requirements rather than one particular vendor's existing backlog, manufacturing, production, or provider preferences.

Similarly, the automatic post-award production milestones, reverse scheduling, and job management communication aspects of the invention enable the buyer's procurement personnel to monitor the production process efficiently at any time and from any computer station with Internet access. This feature ensures that potential manufacturing or delivery problems can be addressed early, thereby enhancing quality control and contract compliance.

Third, the invention creates a unique type of enhanced competitive bidding that virtually guarantees the submission of numerous bids containing contribution-level pricing for each and every job. By furnishing the buyer with easy, efficient Internet-based tools to create specifications, disseminate solicitations, and receive and evaluate bids from some or all of a potentially large number of pre-qualified and buyer-approved vendors, the invention makes it more cost effective to solicit competitive bidding on all jobs, including the type of short-term, small-dollar jobs best-suited to fill production holes and generate contribution pricing.

Moreover, once approved for a buyer's base of pre-qualified vendors, the invention enables the vendor to obtain individual jobs without having to expend additional costs on sales or marketing. These savings in sales commissions and marketing costs can then be passed onto the buyer, while the vendor is assured access to future bidding opportunities that match the vendor's quantified quality level and/or manufacturing, production, or provider capabilities. This assured access not only furnishes the vendor with bidding opportunities on the type of short-term work most likely to generate "contribution" pricing, but also allows the vendor to bid high, low, or not at all without fear of undermining the buyer's goodwill or compromising the vendor's opportunities to bid future jobs.

Knowing beforehand that the award will routinely go to the lowest responsive and responsible bidder, each participating vendor will also have an incentive to submit their lowest bid upfront, rather than hold back their lowest bid in the expectation that the buyer will "shop" the bid around or otherwise engage in post-bid opening price negotiations. Similarly, having the ability to review a complete set of detailed objective specifications before bidding, the vendor no longer will need to build pricing cushions into its bids in order offset unforeseen production expenses. Instead, vendors can calculate their bids more precisely and hence more competitively, at the time of submission.

Lastly, the invention offers an additional feature whereby, at the sole discretion of the buyer, all received bids can be released after award to all vendors who were invited to respond. In this manner, the invention allows the buyer to take advantage of an inherent "ratcheting down" effect as each vendor learns how low the price range is likely to be on similar jobs in the future. These factors taken together virtually assure the buyer of receiving "contribution pricing" from numerous responding vendors on each and every job.

In sum, by harnessing Internet technology to handle all five major steps or operations of an electronic commerce system for procuring customized goods and services-viz., (1) vendor base selection and management; (2) job estimating, specification writing, review, and approval; (3) solicitation distribution, bidding, and award; (4) job production management, quality control, and contract compliance; and (5) invoicing, payment, and cost allocation—the buyer can create and manage large multiple vendor pools to obtain the benefits of competitive bidding based on contribution pricing, while enhancing administrative productivity, production quality, and contract compliance. In this way, the invention enables the buyer to overcome the limitations of prior art systems and methods in escaping the "iron triangle" of quality, timeliness, and cost.

It is to be understood that the present invention is described above in reference to specific embodiments which are for purposes of example only, and that the invention is not limited to the specific arrangement, order of processing, or hardware for carrying out the steps as described above or shown in the drawings, but also comprises the various modifications readily apparent to one skilled in the art upon reading this specification, as defined by the broadest scope of the appended claims.

The invention claimed is:

1. A system comprising one or more non-transitory computer readable medium containing computer-readable instructions executable on one or more computer processors that are operatively connected to the computer readable medium to perform a method for facilitating selection of a vendor of customized goods or services by a buyer or agent of the buyer in a transaction with the selected vendor, the method comprising the steps of:

processing at least one electronic communication including vendor data used in establishing a plurality of vendor records stored in at least one database, the vendor records corresponding to each of a plurality of vendors and having vendor capability data identifying a plurality of capabilities of each vendor for providing a customized good or service, where the customized good or service is produced or performed after the selection of the vendor;

processing at least one electronic communication including vendor pool information identifying a plurality of vendors which are selected for inclusion in one or more vendor pools associated with one or more buyers for receiving a job solicitation, and storing electronic data in at least one database that identifies each vendor pool by identifying, for each vendor pool, one or more buyers associated with that vendor pool;

processing at least one electronic communication including job information associated with a buyer after the vendor records and the buyer's vendor pool have been established, the job information including job descriptor data which specifies a plurality of characteristics of the customized good or service for a job on which the buyer or agent of the buyer seeks to receive a bid;

automatically comparing via a computer processor the vendor records to the job information, wherein at least one of the plurality of characteristics for the customized good or service is designated as selection criteria and compared with a corresponding vendor capability from the plurality of capabilities for the vendors from the buyer's vendor pool;

automatically identifying via a computer processor one or more subsets from the buyer's vendor pool as qualified for receiving the job solicitation, based on said comparison;

thereafter transmitting the job solicitation to one or more selected members from at least one of the identified subsets of the buyer's vendor pool;

receiving and processing a bid response from at least one of the vendors which received the job solicitation, the bid response including bid response data identifying a bid price for the job from a corresponding vendor; and outputting to the buyer or agent of the buyer an electronic communication providing the bid response data from at least one of the bid responses.

2. The system according to claim 1, wherein the designated selection criterion includes a product category.

3. The system according to claim 2, wherein a further designated selection criterion includes at least one of a quality level, geographic location, an ownership characteristic, and a union status.

4. The system according to claim 2, wherein a vendor name is further designated as a selection criterion.

5. The system according to claim 1 further comprising steps of: ranking said bid response data according to the bid price.

6. The system according to claim 1 further comprising steps of:
ranking said bid response data according to bid price; and
publishing ranked bid response data.

7. The system according to claim 1 further comprising steps of:
ranking said bid response data according to bid price; and
publishing information to other vendors identifying a selected vendor and a rank order value of said bid response data.

8. The system according to claim 1, wherein said vendor capability data represents a vendor's capability to manufacture or perform each of a plurality of different types of customized goods or services.

9. The system according to claim 1, wherein a status of a vendor in the vendor pool associated with the buyer is not altered as a result of a bid or failure to bid of the vendor.

10. The system according to claim 1, wherein an award is made only to a lowest bidder.

11. A system comprising one or more non-transitory computer readable medium containing computer-readable instructions executable on one or more computer processors that are operatively connected to the computer readable medium to perform a method for facilitating selection of a vendor of customized goods or services by a buyer or agent of the buyer in a transaction with the selected vendor, the method comprising the steps of:

processing at least one electronic communication including vendor data used in establishing a plurality of vendor records stored in at least one database, the vendor records corresponding to each of a plurality of vendors and having vendor capability data identifying a plurality of capabilities of each vendor for providing a customized good or service, where the customized good or service is produced or performed after the selection of the vendor;

processing at least one electronic communication enabling one or more of the vendors from the plurality of vendors to participate in a vendor pool associated with a buyer for receiving a job solicitation;

processing at least one electronic communication including job information associated with a buyer after the vendor records and the buyer's vendor pool have been established, the job information including a job descriptor data which specifies a plurality of characteristics of the customized good or service for a job on which the buyer or agent of the buyer seeks to receive a bid;

automatically comparing via a computer processor the vendor records to the job information, wherein at least one of the plurality of characteristics for the customized good or service is designated as selection criteria and compared with a corresponding vendor capability from the plurality of capabilities for the vendors from the buyer's vendor pool;

automatically identifying via a computer processor one or more subsets from the buyer's vendor pool as qualified for receiving the job solicitation, based on said comparison;

thereafter transmitting the job solicitation to one or more selected members from at least one of the identified subsets of the buyer's vendor pool;

receiving and processing a bid response from at least one of the vendors which received the job solicitation, the bid response including bid response data identifying a bid price for the job from a corresponding vendor; and outputting to the buyer or agent of the buyer an electronic communication providing the bid response data from at least one of the bid responses.

12. The system according to claim 11, wherein the designated selection criterion includes a product category.

13. The system according to claim 12, wherein a further designated selection criterion includes at least one of a quality level, geographic location, an ownership characteristic, and a union status.

14. The system according to claim 12, wherein a vendor name is further designated as a selection criterion.

15. The system according to claim 11 further comprising steps of: ranking said bid response data according to the bid price.

16. The system according to claim 11 further comprising steps of:
ranking said bid response data according to bid price; and
publishing ranked bid response data.

17. The system according to claim 11 further comprising steps of:
   ranking said bid response data according to bid price; and
   publishing information to other vendors identifying a selected vendor and a rank order value of said bid response data.

18. The system according to claim 11, wherein said vendor capability data represents a vendor's capability to manufacture or perform each of a plurality of different types of customized goods or services.

19. The system according to claim 11, wherein a status of a vendor in the vendor pool associated with the buyer is not altered as a result of a bid or failure to bid of the vendor.

20. The system according to claim 11, wherein an award is made only to a lowest bidder.

* * * * *